US012696153B2

(12) United States Patent
Liu et al.

(10) Patent No.: US 12,696,153 B2
(45) Date of Patent: Jul. 28, 2026

(54) INFORMATION TRANSMISSION METHOD AND DEVICE IN INTEGRATED ACCESS AND BACKHAUL NODE GROUP SWITCHING, AND NETWORK DEVICE

(71) Applicant: DATANG MOBILE COMMUNICATIONS EQUIPMENT CO., LTD., Beijing (CN)

(72) Inventors: Ziqiao Liu, Beijing (CN); Da Wang, Beijing (CN); Jiancheng Sun, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 764 days.

(21) Appl. No.: 18/005,588

(22) PCT Filed: Aug. 6, 2021

(86) PCT No.: PCT/CN2021/111260
§ 371 (c)(1),
(2) Date: Jan. 13, 2023

(87) PCT Pub. No.: WO2022/028593
PCT Pub. Date: Feb. 10, 2022

(65) Prior Publication Data
US 2023/0276322 A1      Aug. 31, 2023

(30) Foreign Application Priority Data
Aug. 7, 2020      (CN) .......................... 202010791039.5

(51) Int. Cl.
*H04W 36/08*          (2009.01)
*H04W 36/00*          (2009.01)

(52) U.S. Cl.
CPC ....... *H04W 36/08* (2013.01); *H04W 36/0033* (2013.01)

(58) Field of Classification Search
CPC ............. H04W 88/085; H04W 84/047; H04W 36/087; H04W 36/08; H04W 36/0055;
(Continued)

(56) References Cited

U.S. PATENT DOCUMENTS

2021/0112415 A1*   4/2021   Lee ......................... H04L 69/40
2021/0227435 A1*   7/2021   Hsieh .................. H04W 36/087
(Continued)

FOREIGN PATENT DOCUMENTS

CN          109246773 A        1/2019
CN          110536350 A        12/2019
(Continued)

OTHER PUBLICATIONS

Extended European Search Report for the corresponding European Application No. 21853733.0 issued by the European Patent Office on Jan. 4, 2024.
(Continued)

*Primary Examiner* — Allahyar Kasraian
(74) *Attorney, Agent, or Firm* — Ladas & Parry, LLP

(57)          ABSTRACT

An information transmission method and an information transmission device in IAB node group switching, and a network device are provided. The method includes receiving first information transmitted by a source CU, the source CU being a CU for a donor in a source path for a migrating node. The first information includes at least one of topological information or context information, the topological information includes a connection relationship between the migrating node and a descendant node of the migrating node, the context information includes at least one of node context information or context information of a UE, the node
(Continued)

context information includes at least one of context information of the migrating node or context information of the descendant node of the migrating node, and the UE includes at least one of a UE connected to the migrating node or a UE connected to the descendant node of the migrating node. According to the present disclosure, it is able to simplify a signaling process for switching the IAB node between the CUs to some extent.

17 Claims, 9 Drawing Sheets

(58) Field of Classification Search
CPC ......... H04W 36/0064; H04W 36/0009; H04W 36/0033; H04W 36/06; H04W 36/12
See application file for complete search history.

(56) References Cited

U.S. PATENT DOCUMENTS

| | | | | |
|---|---|---|---|---|
| 2022/0141749 | A1 | 5/2022 | Luo et al. | |
| 2022/0322464 | A1 | 10/2022 | Luo et al. | |
| 2023/0171651 | A1* | 6/2023 | Liu | H04W 76/12 |
| | | | | 370/331 |
| 2023/0199580 | A1* | 6/2023 | Wang | H04W 36/185 |
| | | | | 370/331 |
| 2023/0269644 | A1* | 8/2023 | Teyeb | H04W 36/10 |
| | | | | 370/331 |
| 2023/0276311 | A1* | 8/2023 | Wu | H04W 36/00 |
| | | | | 370/331 |
| 2023/0362745 | A1* | 11/2023 | Huang | H04W 40/36 |

FOREIGN PATENT DOCUMENTS

| | | |
|---|---|---|
| CN | 111093286 A | 5/2020 |
| CN | 112088544 A | 12/2020 |
| WO | 20190246446 A1 | 12/2019 |
| WO | 2020001064 A1 | 1/2020 |

OTHER PUBLICATIONS

"(TP for NR_IAB BL CR for TS 38.401) INter-CU IAB-node migration," 3GPP TSG-RAN WG3 #106, R3-196959, Reno, NV, USA, Nov. 18-22, 2019, Source: CATT, Agenda Item: 13.3.2.3.

"Inter-donor IAB-node Migration," 3GPP TSG-RAN WG3 Meeting #109-e, R3-204795, E-meeting, Aug. 17-Aug. 28, 2020, Agenda Item: 13.2.1, Source: Qualcomm Incorporated.

International Search Report for PCT Application PCT/CN2021/111260, issued on Oct. 27, 2021 and its English Translation provided by WIPO.

Written Opinion for PCT Application PCT/CN2021/111260, issued on Oct. 27, 2021, and its English Translation provided by WIPO.

International Preliminary Report on Patentability for PCT Application PCT/CN2021/111260, issued on Feb. 7, 2023 and its English Translation provided by WIPO.

"Discussion on inter-CU IAB migration handling," 3GPP TSG RAN WG3 Meeting #105bis, R3-195694, Chongqing, China, Oct. 14-18, 2019, Source: ZTE, Sanechips, Agenda item: 13.3.2.3, all pages.

Office Action and search report for the corresponding Chinese patent Application No. 202010791039.5 issued Oct. 17, 2022, and its English translation provided by global dossier.

* cited by examiner receiving first information transmitted by a source CU  ~ 301

Fig. 3 transmitting first information to a target CU  ~ 401

Fig. 4

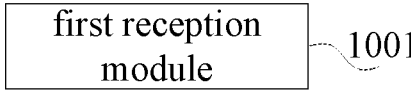
Fig. 9
first transmission module ~1101
Fig. 10
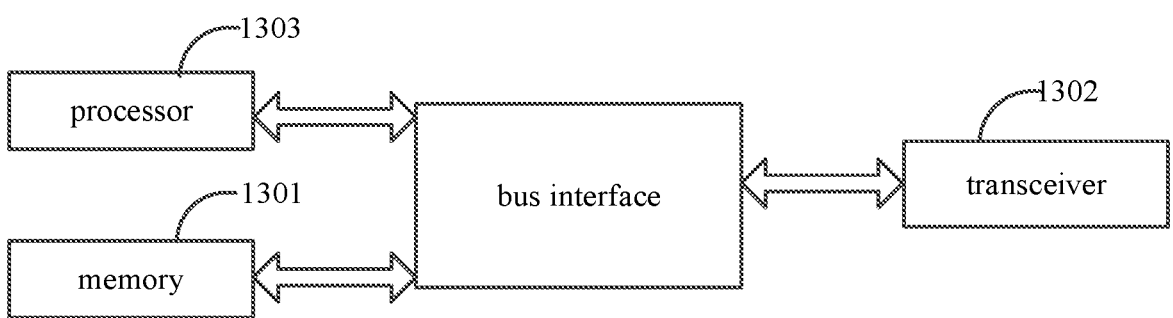
Fig. 11
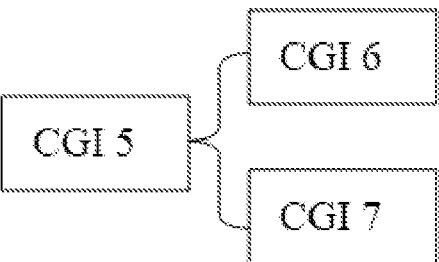
Fig. 12

INFORMATION TRANSMISSION METHOD AND DEVICE IN INTEGRATED ACCESS AND BACKHAUL NODE GROUP SWITCHING, AND NETWORK DEVICE

CROSS-REFERENCE TO RELATED APPLICATIONS

This application is the U.S. national phase of PCT Application No. PCT/CN2021/111260 filed on Aug. 6, 2021, which claims a priority of to the Chinese patent application No. 202010791039.5 filed on Aug. 7, 2020 and entitled "information transmission method and device in integrated access and backhaul node group switching, network device and system", the disclosures of which are incorporated herein by reference in their entireties.

TECHNICAL FIELD

The present disclosure relates to the field of mobile communication technology, in particular to an information transmission method and an information transmission device in Integrated Access and Backhaul (IAB) node group switching, and a network device.

BACKGROUND

Due to the introduction of an IAB technology, it is unnecessary for each User Equipment (UE) to be connected to a Centralized Unit (CU), and instead, the UE merely needs to be connected to IAB nodes. These IAB nodes are uniformly managed by an IAB donor, and the IAB donor directly communicates with a core network, so it is able to achieve the network deployment in a more flexible manner. Currently, a New Radio (NR) system merely supports IAB node switching in a same CU, so the mobility of the IAB node is limited, and it is unable to meet the requirements in actual use. Therefore, it is necessary to introduce the switching of the IAB node between the CUs, so as to enlarge a movement range of the IAB node. However, due to the particularity of IAB, when the IAB node is switched between the CUs, the switching needs to be performed for UEs under the IAB node and UEs under its descendant nodes. At this time, it is necessary to perform signaling interaction with respect to each UE, and thereby a complex signaling process occurs.

SUMMARY

An object of the present disclosure is to provide an information transmission method and an information transmission device in IAB node group switching, and a network device, so as to simplify a signaling process of switching the IAB node between the CUs to some extent.

In a first aspect, the present disclosure provides in some embodiments an information transmission method in IAB node group switching for a target CU, the target CU being a CU for a donor in a target path, the information transmission method including receiving first information transmitted by a source CU, the source CU being a CU for a donor in a source path for a migrating node. The first information includes at least one of topological information or context information, the topological information includes a connection relationship between the migrating node and a descendant node of the migrating node in the source CU, the context information includes at least one of node context information or context information of a UE, the node context information includes context information of the migrating node and context information of the descendant node of the migrating node, and the UEs include a UE connected to the migrating node and a UE connected to the descendant node of the migrating node.

In a possible embodiment of the present disclosure, the present disclosure provides in some embodiments an information transmission method in IAB node group switching for a target CU, the target CU being a CU for a donor in a target path, the information transmission method including receiving first information transmitted by a source CU, the source CU being a CU for a donor in a source path for a migrating node. The first information includes at least one of topological information or context information, the topological information includes a connection relationship between the migrating node and a descendant node of the migrating node, the context information includes at least one of node context information or context information of a UE, the node context information includes at least one of context information of the migrating node or context information of the descendant node of the migrating node, and the UE includes at least one of a UE connected to the migrating node or a UE connected to the descendant node of the migrating node.

In a possible embodiment of the present disclosure, an Xn interface is provided between the source CU and the target CU, and the receiving the first information transmitted by the source CU includes receiving an Xn handover request message transmitted by the source CU, the Xn handover request message carrying the first information.

In a possible embodiment of the present disclosure, no Xn interface is provided between the source CU and the target CU, the receiving the first information transmitted by the source CU includes receiving a handover request message transmitted by a core network, the handover request message is transmitted by the core network after the receipt of a handover preparation message transmitted by the source CU, and each of the handover preparation message and the handover request message carries the first information.

In a possible embodiment of the present disclosure, subsequent to receiving the first information transmitted by the source CU, the information transmission method further includes transmitting the first information to a second access node, wherein the second access node is an access node in the target path.

In a possible embodiment of the present disclosure, the transmitting the first information to the second access node includes transmitting a UE context setup request message to the second access node, wherein the UE context setup request message carries the first information.

In a possible embodiment of the present disclosure, the information transmission method further includes transmitting second information to the source CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the transmitting the second information to the source CU includes transmitting an Xn handover request acknowledgement message to the source CU, wherein the Xn handover request acknowledgement message carries the second information.

In a possible embodiment of the present disclosure, no Xn interface is provided between the source CU and the target CU, the transmitting the second information to the source CU includes transmitting a handover request acknowledgement message to a core network, to enable the core network to transmit a handover command message to the source CU, and each of the handover request acknowledgement message and the handover command message carries the second information.

In a possible embodiment of the present disclosure, the connection relationship between the migrating node and the descendant node of the migrating node includes one of: an association relationship between a Cell Global Identifier (CGI) of the migrating node and a CGI of the descendant node of the migrating node; an association relationship between a Physical Cell Identifier (PCI) of the migrating node and a PCI of the descendant node of the migrating node; an association relationship between an Internet Protocol (IP) address of the migrating node and an IP address of the descendant node of the migrating node; or an association relationship between a Backhaul Adaptation Protocol (BAP) layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, and identification information of to-be-switched Distribution Units (DUs), or the first information further includes at least one of the address information of the source CU, the identification information of the migrating node in the source CU, the identification information of the descendant node of the migrating node in the source CU, the identification information of the second access node in the target CU, or the identification information of DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

In a second aspect, the present disclosure provides in some embodiments an information transmission method for IAB node group switching for a source CU, the source CU being a CU for a donor in a source path for the migrating node, the information transmission method including transmitting first information to a target CU, the target CU being a CU for a donor in a target path. The first information includes at least one of topological information or context information, the topological information includes a connection relationship between the migrating node and a descendant node of the migrating node in the source CU, the context information includes at least one of node context information or context information of a UE, the node context information includes context information of the migrating node and context information of the descendant node of the migrating node, and the UEs include a UE connected to the migrating node and a UE connected to the descendant node of the migrating node.

In a possible embodiment of the present disclosure, the present disclosure provides in some embodiments an information transmission method for IAB node group switching for a source CU, the source CU being a CU for a donor in a source path for the migrating node, the information transmission method including transmitting first information to a target CU, the target CU being a CU for a donor in a target path. The first information includes at least one of topological information or context information, the topological information includes a connection relationship between the migrating node and a descendant node of the migrating node, the context information includes at least one of node context information or context information of a UE, the node context information includes at least one of context information of the migrating node or context information of the descendant node of the migrating node, and the UE includes at least one of a UE connected to the migrating node or a UE connected to the descendant node of the migrating node.

In a possible embodiment of the present disclosure, an Xn interface is provided between the source CU and the target CU, and the transmitting the first information to the target CU includes transmitting an Xn handover request message to the target CU, and the Xn handover request message carrying the first information.

In a possible embodiment of the present disclosure, no Xn interface is provided between the source CU and the target CU, the transmitting the first information to the target CU includes transmitting a handover preparation message to a core network, to enable the core network to transmit a handover request message to the target CU, and each of the handover preparation message and the handover request message carries the first information.

In a possible embodiment of the present disclosure, the information transmission method further includes receiving second information transmitted by the target CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the receiving the second information transmitted by the target CU includes receiving an Xn handover request acknowledgement message carrying the second information transmitted by the target CU.

In a possible embodiment of the present disclosure, no Xn interface is provided between the source CU and the target CU, the receiving the second information transmitted by the target CU includes receiving a handover command message transmitted by a core network, the handover command message is transmitted by the core network upon the receipt of a handover request acknowledgement message transmitted by the target CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, and identification information of to-be-switched DUs, or the first information further includes at least one of the address information of the source CU, the identification information of the migrating node in the source CU, the identification information of the descendant node of the migrating node in the source CU, the identification information of the second access node in the target CU, or the identification information of DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

In a third aspect, the present disclosure provides in some embodiments a network device for a target CU, the target CU being a CU for a donor in a target path, the network device comprising a memory, a transceiver and a processor. The memory is configured to store therein a computer program, and the transceiver is configured to transmit and receive data under the control of the processor. The processor is configured to read the computer program in the memory so as to control the transceiver to receive first information transmitted by a source CU, and the source CU is a CU for a donor in a source path for a migrating node, the first information includes at least one of topological information or context information, the topological information includes a connection relationship between the migrating node and a descendant node of the migrating node in the source CU, the context information includes at least one of node context information or context information of a UE, the node context information includes context information of the migrating node and context information of the descendant node of the migrating node, and the UE includes at least one of a UE connected to the migrating node or a UE connected to the descendant node of the migrating node; or the processor is configured to read the computer program in the memory so as to control the transceiver to receive first information transmitted by a source CU, and the source CU is a CU for a donor in a source path for a migrating node, the first information includes at least one of topological information or context information, the topological information includes a connection relationship between the migrating node and a descendant node of the migrating node, the context information includes at least one of node context information or context information of a UE, the node context information includes at least one of context information of the migrating node or context information of the descendant node of the migrating node, and the UE includes at least one of a UE connected to the migrating node or a UE connected to the descendant node of the migrating node.

In a possible embodiment of the present disclosure, an Xn interface is provided between the source CU and the target CU, and the receiving the first information transmitted by the source CU includes receiving an Xn handover request message transmitted by the source CU, the Xn handover request message carrying the first information.

In a possible embodiment of the present disclosure, no Xn interface is provided between the source CU and the target CU, the receiving the first information transmitted by the source CU includes receiving a handover request message transmitted by a core network, the handover request message is transmitted by the core network after the receipt of a handover preparation message transmitted by the source CU, and each of the handover preparation message and the handover request message carries the first information.

In a possible embodiment of the present disclosure, subsequent to controlling the transceiver to receive the first information transmitted by the source CU, the processor is further configured to control the transceiver to transmit the first information to a second access node, and the second access node is an access node in the target path.

In a possible embodiment of the present disclosure, the transmitting the first information to the second access node includes transmitting a UE context setup request message to the second access node, wherein the UE context setup request message carries the first information.

In a possible embodiment of the present disclosure, the processor is further configured to control the transceiver to transmit second information to the source CU, the second information includes at least one of address information of the target CU, identification information assigned by the target CU to the migrating node, identification information assigned by the target CU to the descendant node of the migrating node, or identification information of a second access node in the target CU, and the second access node is an access node of the target path.

In a possible embodiment of the present disclosure, an Xn interface is provided between the source CU and the target CU, and the processor is further configured to transmit an Xn handover request acknowledgement message carrying the second information to the source CU.

In a possible embodiment of the present disclosure, no Xn interface is provided between the source CU and the target CU, the processor is further configured to transmit a handover request acknowledgement message to a core network, to enable the core network to transmit a handover command message to the source CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes at least one of address information of the source CU, identification information of the migrating node in the source CU, identification information of the descendant node of the migrating node in the source CU, identification information of a second access node in the target CU, or identification information of to-be-switched DUs), or the first information further includes address information of the source CU, identification information of the migrating node in the source CU, identification information of the descendant node of the migrating node in the source CU, identification information of a second access node in the target CU, and identification information of to-be-switched Distribution Units (DUs), or the first information further includes at least one of the address information of the source CU, the identification information of the migrating node in the source CU, the identification information of the descendant node of the migrating node in the source CU, the identification information of the second access node in the target CU, or the identification information of DUs. The second access node is an access node of the target path, and the to-be-switched DUs include a DU of the migrating node and a DU of the descendant node of the migrating node.

In a possible embodiment of the present disclosure, the identification information includes one or more of a PCI, a CGI, or an IP address.

In a fourth aspect, the present disclosure provides in some embodiments a network device for a source CU, the source CU being a CU for a donor in a source path for a migrating node, the network device including a memory, a transceiver and a processor. The memory is configured to store therein a computer program, and the transceiver is configured to transmit and receive data under the control of the processor. The processor is configured to read the computer program in the memory so as to control the transceiver to transmit first information to a target CU, the target CU is a CU for a donor in a target path, the first information includes at least one of topological information or context information, the topological information includes a connection relationship between the migrating node and a descendant node of the migrating node in the source CU, the context information includes at least one of node context information or context information of a UE, the node context information includes context information of the migrating node and context information of the descendant node of the migrating node, and the UEs include a UE connected to the migrating node and a UE connected to the descendant node of the migrating node; or the processor is configured to read the computer program in the memory so as to control the transceiver to transmit first information to a target CU, the target CU is a CU for a donor in a target path, the first information includes at least one of topological information or context information, the topological information includes a connection relationship between the migrating node and a descendant node of the migrating node, the context information includes at least one of node context information or context information of a UE, the node context information includes at least one context information of the migrating node and context information of the descendant node of the migrating node, and the UE includes at least one of a UE connected to the migrating node or a UE connected to the descendant node of the migrating node.

In a possible embodiment of the present disclosure, an Xn interface is provided between the source CU and the target CU, and the transmitting the first information to the target CU includes transmitting an Xn handover request message to the target CU, and the Xn handover request message carrying the first information.

In a possible embodiment of the present disclosure, no Xn interface is provided between the source CU and the target CU, the transmitting the first information to the target CU includes transmitting a handover preparation message to a core network, to enable the core network to transmit a handover request message to the target CU, and each of the handover preparation message and the handover request message carries the first information.

In a possible embodiment of the present disclosure, the processor is further configured to control the transceiver to receive second information transmitted by the target CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the receiving the second information transmitted by the target CU includes receiving an Xn handover request acknowledgement message carrying the second information transmitted by the target CU.

In a possible embodiment of the present disclosure, no Xn interface is provided between the source CU and the target CU, the receiving the second information transmitted by the target CU includes receiving a handover command message transmitted by a core network, the handover command message is transmitted by the core network upon the receipt of a handover request acknowledgement message transmitted by the target CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, and identification information of to-be-switched DUs, or the first information further includes at least one of the address information of the source CU, the identification information of the migrating node in the source CU, the identification information of the descendant node of the migrating node in the source CU, the identification information of the second access node in the target CU, or the identification information of DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

In a fifth aspect, the present disclosure provides in some embodiments an information transmission device in IAB node group switching for a target CU, the target CU being a CU for a donor in a target path, the information transmission device including a first reception module configured to receive first information transmitted by a source CU, the source CU being a CU for a donor in a source path for a migrating node. The first information includes at least one of topological information or context information, the topological information includes a connection relationship between the migrating node and a descendant node of the migrating node in the source CU, the context information includes at least one of node context information or context information of a UE, the node context information includes context information of the migrating node and context information of the descendant node of the migrating node, and the UEs include a UE connected to the migrating node and a UE connected to the descendant node of the migrating node.

In a possible embodiment of the present disclosure, the present disclosure provides in some embodiments an information transmission device in IAB node group switching for a target CU, the target CU being a CU for a donor in a target path, the information transmission device including a first reception module configured to receive first information transmitted by a source CU, the source CU being a CU for a donor in a source path for a migrating node. The first information includes at least one of topological information or context information, the topological information includes a connection relationship between the migrating node and a descendant node of the migrating node, the context information includes at least one of node context information or context information of a UE, the node context information includes at least one of context information of the migrating node or context information of the descendant node of the migrating node, and the UE includes at least one of a UE connected to the migrating node or a UE connected to the descendant node of the migrating node.

In a possible embodiment of the present disclosure, an Xn interface is provided between the source CU and the target CU, and the first reception module is specifically configured to receive an Xn handover request message carrying the first information transmitted by the source CU.

In a possible embodiment of the present disclosure, no Xn interface is provided between the source CU and the target CU, the first reception module is specifically configured to receive a handover request message transmitted by a core network, the handover request message is transmitted by the core network after the receipt of a handover preparation message transmitted by the source CU, and each of the handover preparation message and the handover request message carries the first information.

In a possible embodiment of the present disclosure, the information transmission device further includes a second transmission module configured to transmit the first information to a second access node, and the second access node is an access node in the target path.

In a possible embodiment of the present disclosure, the second transmission module is specifically configured to transmit a UE context setup request message to the second access node, and the UE context setup request message carries the first information.

In a possible embodiment of the present disclosure, the information transmission device further includes a third transmission module configured to transmit second information to the source CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the third transmission module is specifically configured to transmit an Xn handover request acknowledgement message carrying the second information to the source CU.

In a possible embodiment of the present disclosure, no Xn interface is provided between the source CU and the target CU, the third transmission module is specifically configured to transmit a handover request acknowledgement message to a core network, to enable the core network to transmit a handover command message to the source CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, and identification information of to-be-switched DUs, or the first information further includes at least one of the address information of the source CU, the identification information of the migrating node in the source CU, the identification information of the descendant node of the migrating node in the source CU, the identification information of the second access node in the target CU, or identification information of DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

In a sixth aspect, the present disclosure provides in some embodiments an information transmission device in IAB node group switching for a source CU, the source CU being a CU for a donor in a source path for the migrating node, the information transmission device including a first transmission module configured to transmit first information to a target CU, the target CU being a CU for a donor in a target path. The first information includes at least one of topological information or context information, the topological information includes a connection relationship between the migrating node and a descendant node of the migrating node in the source CU, the context information includes at least one of node context information or context information of a UE, the node context information includes at least one of context information of the migrating node or context information of the descendant node of the migrating node, and the UEs include a UE connected to the migrating node and a UE connected to the descendant node of the migrating node.

In a possible embodiment of the present disclosure, the present disclosure provides in some embodiments an information transmission device in IAB node group switching for a source CU, the source CU being a CU for a donor in a source path for the migrating node, the information transmission device including a first transmission module configured to transmit first information to a target CU, the target CU being a CU for a donor in a target path. The first information includes at least one of topological information or context information, the topological information includes a connection relationship between the migrating node and a descendant node of the migrating node, the context information includes at least one of node context information or context information of a UE, the node context information includes at least one of context information of the migrating node or context information of the descendant node of the migrating node, and the UE includes at least one of a UE connected to the migrating node or a UE connected to the descendant node of the migrating node.

In a possible embodiment of the present disclosure, an Xn interface is provided between the source CU and the target CU, and the first transmission module is specifically configured to transmit an Xn handover request message carrying the first information to the target CU.

In a possible embodiment of the present disclosure, no Xn interface is provided between the source CU and the target CU, the first transmission module is specifically configured to transmit a handover preparation message to a core network, to enable the core network to transmit a handover request message to the target CU, and each of the handover preparation message and the handover request message carries the first information.

In a possible embodiment of the present disclosure, the information transmission device further includes a second reception module configured to receive second information transmitted by the target CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the second reception module is specifically configured to receive an Xn handover request acknowledgement message carrying the second information transmitted by the target CU.

In a possible embodiment of the present disclosure, no Xn interface is provided between the source CU and the target CU, the second reception module is specifically configured to receive a handover command message transmitted by a core network, the handover command message is transmitted by the core network upon the receipt of a handover request acknowledgement message transmitted by the target CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, and identification information of to-be-switched Distribution Units (DUs), or the first information further includes at least one of the address information of the source CU, the identification information of the migrating node in the source CU, the identification information of the descendant node of the migrating node in the source CU, the identification information of the second access node in the target CU, or the identification information of DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

In a seventh aspect, the present disclosure provides in some embodiments an information transmission system including the above-mentioned network device in the third aspect and the above-mentioned network device in the fourth aspect.

In an eighth aspect, the present disclosure provides in some embodiments a processor-readable storage medium storing therein a computer program. The computer program is configured to be executed by a processor to implement the above-mentioned method.

In a ninth aspect, the present disclosure provides in some embodiments a computer program including a computer-readable code. The computer-readable code is configured to be executed by a computing processing device to implement the above-mentioned method.

According to the embodiments of the present disclosure, at least one of the topological information or the context information is transmitted through the source CU to the target CU. The topological information includes the connection relationship between the migrating node and a descendant node of the migrating node in the source CU, or includes the connection relationship between the migrating node and a descendant node of the migrating node. The context information includes at least one of the node context information and the context information of the UEs. The node context information includes the context information of the migrating node and the context information of the descendant node of the migrating node, or includes at least one of the context information of the migrating node and the context information of the descendant node of the migrating node. The UE includes at least one of the UE connected to the migrating node and the UE connected to the descendant node of the migrating node, or at least one of the UE connected to the migrating node and the UE connected to the descendant node of the migrating node. Through transmitting, by the source CU, at least one of the topological information or the context information to the target CU, it is unnecessary to perform the signaling interaction with respect to each UE when switching an IAB node between the CUs, thereby to simplify a signaling interaction process to some extent.

The above description is only an overview of the technical solution of the present disclosure. In order to better understand the technical means of the present disclosure, it can be implemented according to the contents of the description, and in order to make the above and other purposes, features and advantages of the present disclosure clearer and more understandable, the specific embodiments of the present disclosure are enumerated below.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 3 is a flow chart of an information transmission method in IAB node group switching for a target CU according to an embodiment of the present disclosure;

FIG. 4 is a flow chart of an information transmission method in IAB node group switching for a source CU according to an embodiment of the present disclosure;

FIG. 9 is a block diagram of an information transmission device in IAB node group switching for a target CU according to an embodiment of the present disclosure;

FIG. 10 is a block diagram of an information transmission device in IAB node group switching for a source CU according to an embodiment of the present disclosure;

FIG. 11 is a block diagram of a network device according to an embodiment of the present disclosure;

FIG. 12 is a schematic view showing a representation of topological information according to an embodiment of the present disclosure;

DETAILED DESCRIPTION

Figure 1:
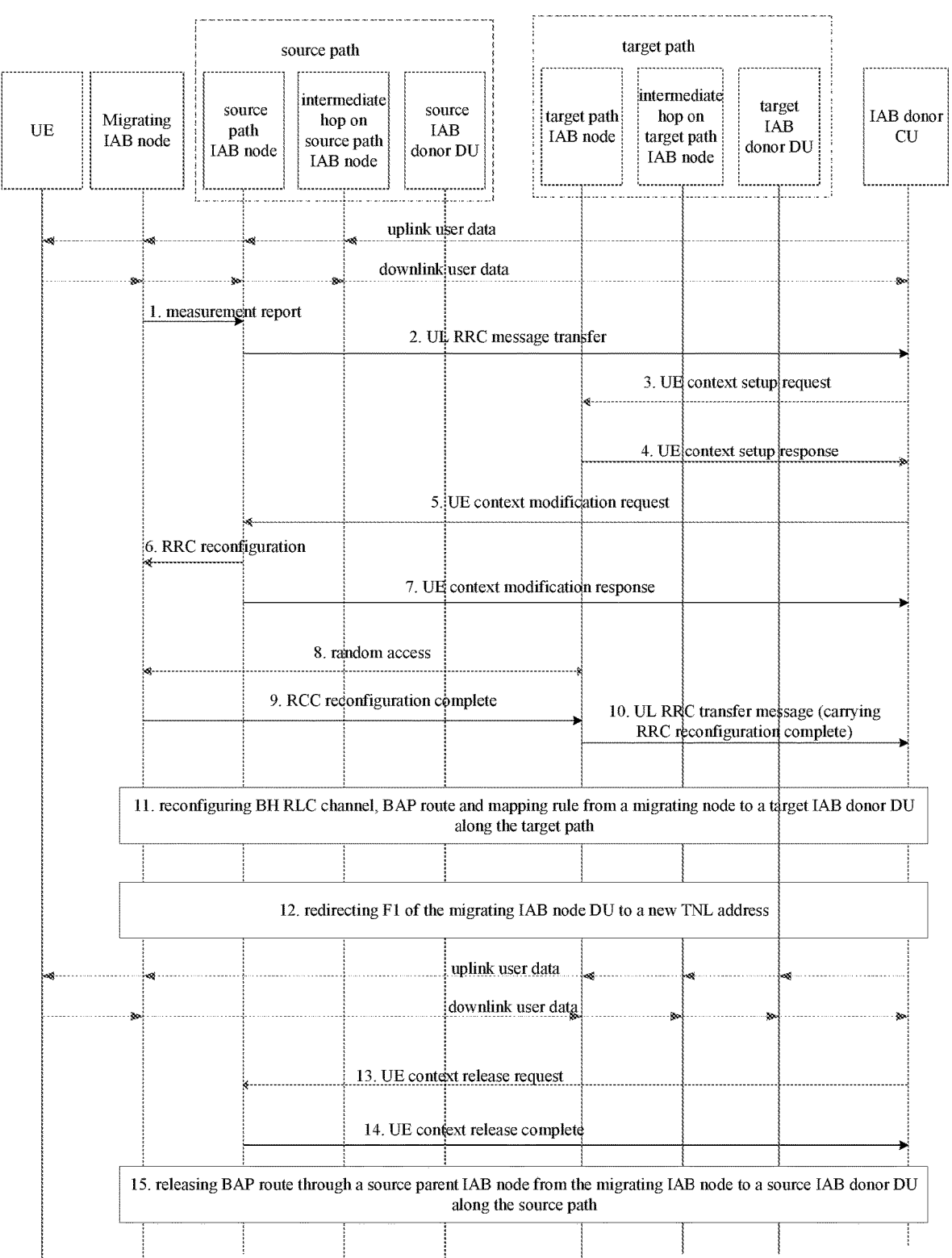
FIG. 1 is a schematic view showing a process of switching IAB node within a CU.

In order to make the objects, the technical solutions and the advantages of the present disclosure more apparent, the present disclosure will be described hereinafter in a clear and thorough manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The expression "and/or" may be merely used to describe the relationship between objects, and it may include three relationships. For example, "A and/or B" may represent that, there is only A, there are both A and B, and there is only B. Further, the symbol "/" usually refers to "or".

The expression "a plurality of" refers to two or more, and the other quantifiers are similar.

The present disclosure will be described hereinafter in a clear and thorough manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide an information transmission method and an information transmission device in IAB node group switching, and a network device, so as to simplify a signaling process of switching the IAB node between the CUs to some extent.

In the embodiments of the present disclosure, methods and devices are based on a same inventive concept, and a principle of the method for solving the problem is similar to that of the corresponding device, so the implementation of the device may refer to that of the method, which will not be further particularly defined.

Schemes in the embodiments of the present disclosure may be applied to various systems, especially 5G systems. For example, the applicable system may be Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or 5th-Generation (5G) New Radio (NR) system. Each of these systems includes a terminal device and a network device. The system may further include a core network part, e.g., an Evolved Packet System (EPS) or 5G system (5GS).

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be further particularly defined herein.

The network device involved in the embodiments of the present disclosure may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present disclosure is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a Home evolved Node B (HeNB), a relay node, a femto, or a pico, which will not be further particularly defined herein. In some network structures, the network device includes a Centralized Unit (CU) and a Distributed Unit (DU), which may be geographically separated from each other.

Multi Input Multi Output (MIMO) transmission is performed between the network device and the terminal each with one or more antennae, and the MIMO transmission may be Single User MIMO (SU-MIMO) or Multiple User MIMO (MU-MIMO). Depending on the form of an antenna combination and the quantity of antennae, the MIMO transmission may be 2D-MIMO, 3D-MIMO, FD-MIMO or massive-MIMO, and it may also be diversity transmission, precoding transmission or beam-forming transmission.

In order to facilitate the understanding of the information transmission method in the IAB node group switching in the embodiments of the present disclosure, a method for switching an IAB node within a CU will be described hereinafter at first.

As shown in FIG. 1, through Mobile Terminal (MT) measurement report of a migrating IAB node, an internal handover process is performed by a CU. The CU notifies, through a UE context setup process, an access node in a target path of UE context information in the migrating IAB node to be switched, and performs reconfiguration on the migrating IAB node, so that the migrating IAB node is capable of accessing a target parent node (i.e., the access node in the target path). After the migrating IAB node has accessed the target parent node successfully, it is necessary to reconfigure a Backhaul (BH) Radio Link Control (RLC) channel, a BAP route and a mapping rule, redirect an F1-C interface for the migrating IAB node, and migrate it to a new Transmission Network Layer (TNL) address. When uplink/downlink data may be transmitted normally, the CU releases a source path for the migrating IAB node.

Figures 3, 4:
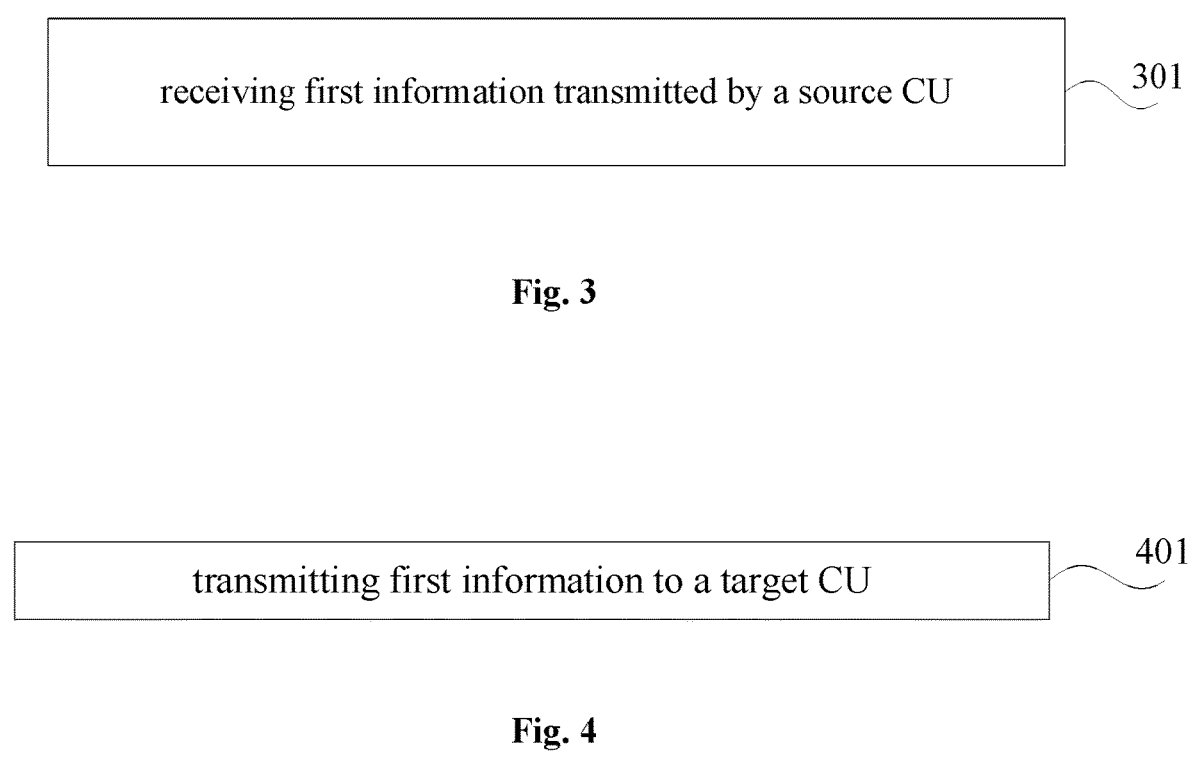

As show in FIG. 3, the present disclosure provides in some embodiments an information transmission method in IAB node group switching for a target CU. The target CU is a CU for a donor in a target path, and the target path is a path to which a migrating node is to be switched.

As shown in FIG. 3, the information transmission method includes Step 301 of receiving first information transmitted by a source CU. The source CU is a CU for a donor in a source path for a migrating node, the first information includes at least one of topological information or context information, the topological information includes a connection relationship between the migrating node and a descendant node of the migrating node in the source CU, or the topological information includes a connection relationship between the migrating node and the descendant node of the migrating node.

Figure 2:
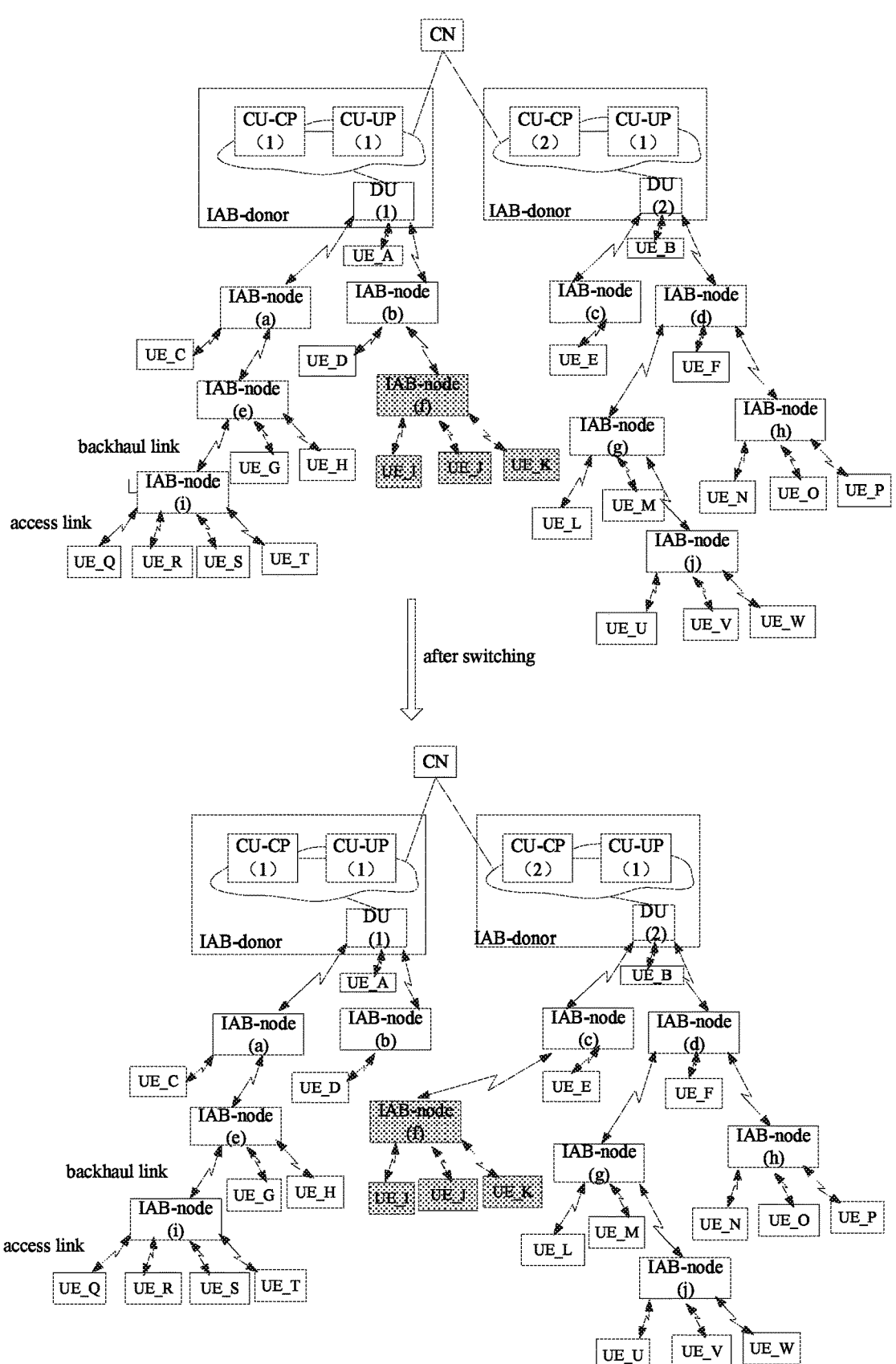
FIG. 2 is a schematic view showing the switching of IAB node between different CUs according to an embodiment of the present disclosure.

For example, as shown in FIG. 2, when an IAB node a is a migrating node and it is switched from an IAB donor CU 1 to an IAB node CU 2, the IAB donor CU 1 needs to transmit a connection relationship (i.e., the topological information) between the IAB node a and descendant nodes of the IAB node a (i.e., an IAB node e and an IAB node i) to the IAB donor CU 2. The IAB donor CU 1 is a source CU, and the IAB donor CU 2 is a target CU.

The context information includes at least one of node context information or context information of a UE. The node context information includes context information of the migrating node and context information of the descendant node of the migrating node, or includes at least one of the context information of the migrating node and the context information of the descendant node of the migrating node. The UEs include a UE connected to the migrating node and a UE connected to the descendant node of the migrating node, or include at least one of the UE connected to the migrating node and the UE connected to the descendant node of the migrating node.

A process of migrating a migrating node and its descendant node between the source CU and the target CU mainly includes a process of switching a to-be-switched MT to the target CU, a process of establishing a connection between a to-be-switched DU and the target CU, and a process of switching a data transmission path for the UE to the target CU. The to-be-switched MT include an MT for the migrating node and an MT for the descendant node of the migrating node, and MT refers to mobile terminal. The to-be-switched DU includes a DU for the migrating node and a DU for the descendant node of the migrating node.

It should be appreciated that, an order of the process of switching the to-be-switched MT to the target CU and the process of establishing the connection between the to-be-switched DU and the target CU will not be particularly defined herein, i.e., the to-be-switched MT may be switched to the target CU and then the connection between the to-be-switched DU and the target CU may be established, or the connection between the to-be-switched DU and the target CU may be established and then the to-be-switched MT may be switched to the target CU.

Because the first information includes the topological information, the target CU knows the nodes connected to the migrating node. In this way, it is able to facilitate the migration of the migrating node and its descendant nodes between the source CU and the target CU.

Because the first information includes the context information, it is able to switch the to-be-switched MT to the target CU without any necessity to obtain the context information through the interaction with respect to each node or each UE, thereby to simplify the signaling interaction process to some extent.

Based on the above, according to the embodiments of the present disclosure, at least one of the topological information or the context information is transmitted through the source CU to the target CU. The topological information includes the connection relationship between the migrating node and a descendant node of the migrating node in the source CU, or the connection relationship between the migrating node and a descendant node of the migrating node. The context information includes at least one of the node context information and the context information of the UEs, the node context information includes the context information of the migrating node and the context information of the descendant node of the migrating node, or includes at least one of the context information of the migrating node and the context information of the descendant node of the migrating node. The UEs include the UE connected to the migrating node and the UE connected to the descendant node of the migrating node, or include at least one of the UE connected to the migrating node and the UE connected to the descendant node of the migrating node. Through transmitting, by the source CU, at least one of the topological information or the context information to the target CU, it is unnecessary to perform the signaling interaction with respect to each UE when switching an IAB node between the CUs, thereby to simplify a signaling interaction process to some extent.

In a possible embodiment of the present disclosure, an Xn interface is provided between the source CU and the target CU, and the receiving the first information transmitted by the source CU includes receiving an Xn handover request message transmitted by the source CU, the Xn handover request message carrying the first information.

In other words, the first information may be carried in the Xn handover request message, and then the Xn handover request is transmitted by the source CU to the target CU. The first information includes at least one of the topological information and the context information, so at least one of the topological information and the context information is carried in the Xn handover request message.

In a possible embodiment of the present disclosure, no Xn interface is provided between the source CU and the target CU, the receiving the first information transmitted by the source CU includes receiving a handover request message transmitted by a core network, the handover request message is transmitted by the core network after the receipt of a handover preparation message transmitted by the source CU, and each of the handover preparation message and the handover request message carries the first information.

In other words, the first information is carried in the handover preparation message, and then the handover preparation message is transmitted by the source CU to the core network. Next, the first information is carried in the handover request message, and then the handover request message is transmitted by the core network to the target CU. In this way, at least one of the topological information and the context information is transmitted by the source CU to the target CU.

In a possible embodiment of the present disclosure, the first information further includes address information of the source CU, identification information of the migrating node in the source CU (e.g., PCI and CGI), identification information of the descendant node of the migrating node in the source CU (e.g., PCI and CGI), identification information of a second access node in the target CU (e.g., CGI), and identification information of a to-be-switched DU (e.g., CU ID). Alternatively, the first information further includes at least one of the address information of the source CU, the identification information of the migrating node in the source CU, the identification information of the descendant node of the migrating node in the source CU, the identification information of a second access node in the target CU, and the identification information of the to-be-switched DU. The second access node is an access node in the target path, and the to-be-switched DU includes a DU for the migrating node and a DU for the descendant node of the migrating node.

When the first information includes the address information of the source CU, the target CU determines a sender which sends the first information, and then transmits information back to the source CU in accordance with the address information.

When the first information includes the address information of the migrating node in the source CU and the address information of the descendant node of the migrating node in the source CU, the target CU determines the nodes to be switched, and then assigns the address information of these nodes in the target CU for these nodes.

When the first information includes the address information of the second access node in the target CU, the target CU determines a node to which the MT for the migrating node and the MT for the descendant node of the migrating node access, so as to switch the MT for the migrating node and the MT for its descendant node to the target CU.

When the first information includes the identification information of the to-be-switched DU, the target CU determines the nodes for which the DUs need to be connected to the target CU, i.e., determines the nodes for which an F1-setup process needs to be performed.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

Figure 13:
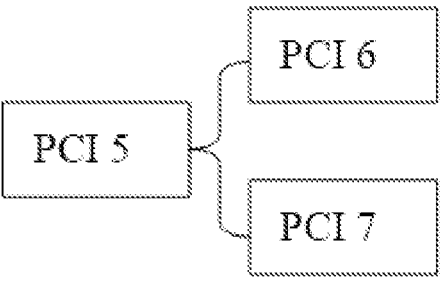
FIG. 13 is another schematic view showing the representation of the topological information according to an embodiment of the present disclosure.
Figure 14:
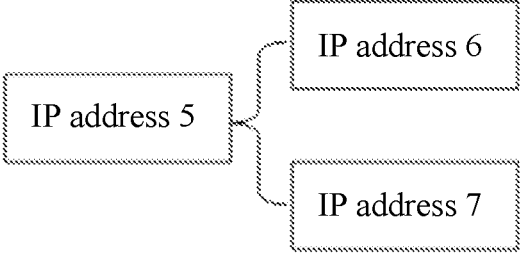
FIG. 14 is yet another schematic view showing the representation of the topological information according to an embodiment of the present disclosure.
Figure 15:
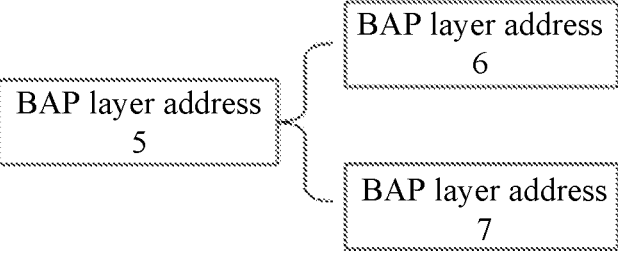
FIG. 15 is still yet another schematic view showing the representation of the topological information according to an embodiment of the present disclosure.

In other words, the topological information may be represented in the form of CGI (e.g., as shown in FIG. 12, each of a node represented by CGI6 and a node represented by CGI7 are connected to a node represented by CGI5), or in the form of PCI (e.g., as shown in FIG. 13, each of a node represented by PCI6 and a node represented by PCI7 are connected to a node represented by PCI5), or in the form of IP address (e.g., as shown in FIG. 14, each of a node represented by IP6 and a node represented by IP7 are connected to a node represented by IP5), or in the form of BAP layer address (e.g., as shown in FIG. 15, each of a node represented by BAP6 and a node represented by BAP7 are connected to a node represented by BAP5).

In a possible embodiment of the present disclosure, subsequent to receiving the first information transmitted by the source CU, the information transmission method further includes transmitting the first information to a second access node, wherein the second access node is an access node in the target path.

Through transmitting the context information to the second access node, it is able for the second access node to perform configuration and relevant scheduling on the migrating node and the UE, e.g., establish one or more bearers for the signaling or data transmission.

In a possible embodiment of the present disclosure, the transmitting the first information to the second access node includes transmitting a UE context setup request message to the second access node, wherein the UE context setup request message carries the first information.

In other words, the first information (at least one of the topological information and the context information) may be carried in the UE context setup request message, and then the UE context setup request message is transmitted by the target CU to the second access node.

In a possible embodiment of the present disclosure, the information transmission method further includes transmitting second information to the source CU, the second information includes at least one of address information of the target CU, identification information assigned by the target CU to the migrating node (including CGI, or including CGI and at least one of PCI and IP address information), identification information assigned by the target CU to the descendant node of the migrating node (including CGI, or including CGI and PCI), or identification information of a second access node in the target CU (including CGI), and the second access node is an access node in the target path.

It should be appreciated that, after the migrating node and its descendant node have been migrated to the target CU, the CGI changes. Hence, the target CU needs to assign the CGIs to the migrating node and its descendant node. When there is a conflict between the PCI of the migrating node for the source CU and an existing PCI in the target CU, the target CU needs to re-assign the PCI to the migrating node. Identically, when there is a conflict between the PCI for the descendant node of the migrating node for the source CU and the existing PCI in the target CU, the target CU needs to re-assign the PCI for the descendant node of the migrating node.

When the second information includes the address information of the target CU, the source CU is capable of determining a node which has transmitted the second information.

When the second information includes the identification information assigned by the target CU to the migrating node and the identification information assigned by the target CU to the descendant node of the migrating node, the source CU is capable of determining the identification information of the migrating node and its descendant node in the target CU.

When the second information includes the identification information of the second access node in the target CU, the source CU is capable of determining a node to which the MT for the migrating node and the MT for the descendant node need to access, so as to switch the MT for the migrating node and the MT for its descendant node to the target CU.

In a possible embodiment of the present disclosure, an Xn interface is provided between the source CU and the target CU, and the transmitting the second information to the source CU includes transmitting an Xn handover request acknowledgement message to the source CU, wherein the Xn handover request acknowledgement message carrying the second information.

In other words, the second information is carried in the Xn handover request acknowledgement message, and then the Xn handover request acknowledgement message is transmitted by the target CU to the source CU. At least one of the address information of the target CU, the identification information assigned by the target CU to the migrating node, the identification information assigned by the target CU to the descendant node of the migrating node, or the identification information of the second access node in the target CU is carried in the Xn handover request acknowledgement message.

In a possible embodiment of the present disclosure, no Xn interface is provided between the source CU and the target CU, the transmitting the second information to the source CU includes transmitting a handover request acknowledgement message to a core network, to enable the core network to transmit a handover command message to the source CU, and each of the handover request acknowledgement message and the handover command message carries the second information.

In other words, the second information is carried in the handover request acknowledgement message, and then the handover request acknowledgement message is transmitted by the target CU to the core network. Next, the second information is carried in the handover command message, and then the handover command message is transmitted by the core network to the source CU. In this way, it is able to transmit the second information by the target CU to the source CU.

In addition, usually IAB is applied to a high-speed train. An IAB node is arranged in the high-speed train, and some descendant nodes of the IAB node are arranged in the other carriages, so that the UEs in each carriage may be directly connected to these descendant nodes. During the travelling, the IAB node in the carriage is also called as a migrating IAB node. The migrating IAB node needs to move at a high speed along with the UEs connected thereto and its descendant nodes. At this time, it is necessary to switch the IAB node between base station CUs at different locations.

As shown in FIG. 2, a UE_D is connected to an IAB node b, and a UE_I, a UE_J and a UE_K are connected to its descendant IAB node f A source path for the IAB node b is IAB donor CU 1, and a target path thereof is IAB donor CU 2. After the IAB node b is switched from the source path to the target path, its descendant node IAB node f, the UE_D connected to the IAB node b, and the UE_I, the UE_J and the UE_K connected to the IAB node f (which is a sub-node of the IAB node b) are all switched from the source path to the target path. In FIG. 2, CN is the core network, CU-CP is a CU control plane, and CU-UP is a CU user plane.

In a possible embodiment of the present disclosure, the identification information includes at least one of a PCI, a CGI and an IP address.

To be specific, the target CU uses the information transmission method to perform an IAB node group switching process through the following steps H1 to H6.

Step H1: the target CU receives the first information transmitted by the source CU. The first information includes the address information of the source CU, the identification information of the migrating node in the source CU, the identification information of the descendant node of the migrating node in the source CU, the identification information of the second access node in the target CU, the identification information of the to-be-switched DU, the topological information and the context information. The topological information includes the connection relationship between the migrating node and the descendant node of the migrating node. The context information includes at least one of the node context information and the context information of the UEs. The node context information includes the context information of the migrating node and the context information of the descendant node of the migrating node.

Step H2: the target CU transmits the topological information and the context information to the second access node.

Step H3: the target CU transmits the second information to the source CU. The second information includes the address information of the target CU, the identification information assigned by the target CU to the migrating node, the identification information assigned by the target CU to the descendant node of the migrating node, and the identification information of the second access node in the target CU.

Step H4: the target CU interacts with the source CU and the to-be-switched MT, so as to switch the to-be-switched MT to the target CU.

Step H5: the target CU interacts with the to-be-switched DU, so as to establish a connection between the to-be-switched DU and the target CU.

Step H6: the target CU interacts with the source CU, the migrating node and the UE, and the RRC reconfiguration is performed on the UE through the target CU, so as to switch a data transmission path for the UE to the target CU.

In a possible embodiment of the present disclosure, when there is an Xn interface between the source CU and the target CU, prior to Step H5, the IAB node group switching process further includes transmitting a connection release indicator to the source CU, and the connection release indicator is used to indicate to release the connection between the source CU and the to-be-switched DU.

It should be appreciated that, a source F1 connection (i.e., the connection between the to-be-switched DU and the source CU) may be, or may not be, released. When the source F1 connection is not released, a new F1 connection (i.e., a connection between the to-be-switched DU and the target CU) is established, and meanwhile the source F1 connection is maintained. In addition, when the source F1 connection is not released, a connection on an original path is maintained by the to-be-switched MT. When the source F1 connection is released, the to-be-switched MT maintains its connection with both the target path and the source path, or it is completely switched to the target path.

In a possible embodiment of the present disclosure, when there is the Xn interface between the source CU and the target CU, Step H5 includes: after the to-be-switched MT has been switched to the target CU, receiving an F1 connection setup request message from the to-be-switched DU, the F1 connection setup request message carrying identification information of the to-be-switched DU; establishing a connection with the to-be-switched DU in accordance with the F1 connection setup request message; and transmitting an F1 connection setup response message to the to-be-switched DU. Alternatively, Step H5 includes: transmitting F1 interface configuration information to the source CU, and instructing the source CU to forward the F1 interface configuration information to a to-be-switched DU corresponding to the F1 interface configuration information, so that the to-be-switched DU establishes a connection between the to-be-switched DU and the target CU in accordance with the F1 interface configuration information, the F1 interface configuration information including F1 interface information configured by the target CU for the to-be-switched DU; and receiving a first migration confirmation message from the to-be-switched DU, the first migration confirmation message being used to indicate that the connection between the to-be-switched DU and the target CU has been established successfully. Alternatively, Step H5 includes: transmitting the F1 interface configuration information to the source CU, and instructing the source CU to forward the F1 interface configuration information to the to-be-switched DU corresponding to the F1 interface configuration information; and receiving a second migration confirmation message forwarded by the source CU for the to-be-switched DU, the second migration confirmation message being used to instruct the to-be-switched DU to establish the connection between the to-be-switched DU and the target CU in accordance with the F1 interface configuration information.

To be specific, based on the above, when there is the Xn interface between the source CU and the target CU, the connection between the to-be-switched DU and the target CU is established through any of the following three modes.

First mode: after the to-be-switched MT has been switched to the target CU, the to-be-switched DU transmits the F1 connection setup request message to the target CU, so as to enable the target CU to establish the connection with the to-be-switched DU in accordance with the F1 connection setup request message, thereby to transmit the F1 connection setup response message to the to-be-switched DU.

Second mode: after the source CU has transmitted the Xn handover request message to the target CU, the target CU transmits the F1 interface configuration information to the source CU, so that the source CU transmits the F1 interface configuration information to the to-be-switched DU corresponding to the F1 interface configuration information. The to-be-switched DU establishes its connection with the target CU in accordance with its received F1 interface configuration information, and after the connection has been established successfully, the to-be-switched DU transmits the first migration confirmation message to the target CU.

Third mode: after the source CU has transmitted the Xn handover request message to the target CU, the target CU transmits the F1 interface configuration information to the source CU, so that the source CU transmits the F1 interface configuration information to the to-be-switched DU corresponding to the F1 interface configuration information. The to-be-switched DU transmits the second migration confirmation message to the source CU, and the source CU forwards the second migration confirmation message to the target CU. Then, the to-be-switched DU establishes the connection between the to-be-switched DU and the target CU in accordance with the F1 interface configuration information.

In a possible embodiment of the present disclosure, when there is no Xn interface between the source CU and the target CU, Step H5 includes: after the to-be-switched MT has been switched to the target CU, receiving an F1 connection setup request message from the to-be-switched DU, the F1 connection setup request message carrying identification information of the to-be-switched DU; establishing a connection with the to-be-switched DU in accordance with the F1 connection setup request message; and transmitting an F1 connection setup response message to the to-be-switched DU. Alternatively, Step H5 includes: transmitting F1 interface configuration information to the core network, and instructing the core network to forward the F1 interface configuration information to the source CU, so that the source CU forwards the F1 interface configuration information to a to-be-switched DU corresponding to the F1 interface configuration information and the to-be-switched DU establishes the connection between the to-be-switched DU and the target CU in accordance with the F1 interface configuration information, the F1 interface configuration information including F1 interface information configured by the target CU for the to-be-switched DU; and receiving a first migration confirmation message from the to-be-switched DU, the first migration confirmation message being used to indicate that the connection between the to-be-switched DU and the target CU has been established successfully. Alternatively, Step H5 includes: transmitting the F1 interface configuration information to the core network, and instructing the core network to forward the F1 interface configuration information to the source CU, so that the source CU forwards the F1 interface configuration information to the to-be-switched DU corresponding to the F1 interface configuration information; and receiving a second migration confirmation message forwarded by the source CU and the core network for the to-be-switched DU, the second migration confirmation message being used to instruct the to-be-switched DU to establish the connection between the to-be-switched DU and the target CU in accordance with the F1 interface configuration information.

To be specific, based on the above, when there is no Xn interface between the source CU and the target CU, the connection between the to-be-switched DU and the target CU is established through any of the following three modes.

First mode: after the to-be-switched MT has been switched to the target CU, the to-be-switched DU transmits the F1 connection setup request message to the target CU, so as to enable the target CU to establish the connection with the to-be-switched DU in accordance with the F1 connection setup request message, thereby to transmit the F1 connection setup response message to the to-be-switched DU.

Second mode: after the core network has transmitted the handover request message to the target CU, the target CU transmits the F1 interface configuration information to the core network, so that the core network forwards the F1 interface configuration information to the source CU and the source CU forwards the F1 interface configuration information to the to-be-switched DU corresponding to the F1 interface configuration information. The to-be-switched DU establishes the connection with the target CU in accordance with the received F1 interface configuration information, and after the connection has been established successfully, the to-be-switched DU transmits the first migration confirmation message to the target CU.

Third mode: after the core network has transmitted the handover request message to the target CU, the target CU transmits the F1 interface configuration information to the core network, to enable the core network to transmit the F1 interface configuration information to the source CU and the source CU transmits the F1 interface configuration information to the to-be-switched DU corresponding to the F1 interface configuration information. The to-be-switched DU transmits the second migration confirmation message to the source CU, the source CU forwards the second migration confirmation message to the core network, and the core network forwards the second migration confirmation message to the target CU. Then, the to-be-switched DU establishes the connection between the to-be-switched DU and the target CU in accordance with the received F1 interface configuration information.

In a possible embodiment of the present disclosure, Step H6 includes: transmitting a first RRC reconfiguration indicator to the migrating node so that the migrating node transmits the first RRC reconfiguration indicator to the UE and the UE generates a first RRC reconfiguration completion message after the UE has performed the RRC reconfiguration in accordance with the first RRC reconfiguration indicator; receiving the first RRC reconfiguration completion message forwarded by the migrating node for the UE; and instructing the core network to instruct the data transmission path for the UE to the target CU. The first RRC reconfiguration indicator is used to indicate to perform the RRC reconfiguration through the target CU.

In other words, after the migrating node and its descendant node have been migrated to the target CU, the target CU transmits the first RRC reconfiguration indicator to the migrating node so that the migrating node forwards the first RRC reconfiguration indicator to the UE. The UE performs the RRC reconfiguration in accordance with the first RRC reconfiguration indicator, generates the first RRC reconfiguration completion message after the reconfiguration has been completed, and transmits the first RRC reconfiguration completion message to the migrating node. The migrating node transmits the first RRC reconfiguration completion message to the target CU, so that the target CU instructs the core network to switch the data transmission path for the UE to the target CU.

As shown in FIG. 4, the present disclosure further provides in some embodiments an information transmission method in IAB node group switching for a source CU. The source CU is a CU for a donor in a source path for the migrating node. The information transmission method includes Step 401 of first information to a target CU. The target CU is a CU for a donor in a target path. The first information includes at least one of topological information or context information. The topological information includes a connection relationship between the migrating node and a descendant node of the migrating node in the source CU, or includes the connection relationship between the migrating node and the descendant node of the migrating node. The context information includes at least one of node context information or context information of a UE. The node context information includes context information of the migrating node and context information of the descendant node of the migrating node, or includes at least one of the context information of the migrating node and the context information of the descendant node of the migrating node. The UEs include a UE connected to the migrating node and a UE connected to the descendant node of the migrating node, or include at least one of the UE connected to the migrating node and the UE connected to the descendant node of the migrating node.

A process of migrating a migrating node and its descendant node between the source CU and the target CU mainly includes a process of switching a to-be-switched MT to the target CU, a process of establishing a connection between a to-be-switched DU and the target CU, and a process of switching a data transmission path for the UE to the CU. The to-be-switched MT includes an MT for the migrating node and an MT for the descendant node of the migrating node, and MT refers to mobile terminal. The to-be-switched DU includes a DU for the migrating node and a DU for the descendant node of the migrating node.

It should be appreciated that, an order of the process of switching the to-be-switched MT to the target CU and the process of establishing the connection between the to-be-switched DU and the target CU will not be particularly defined herein, i.e., the to-be-switched MT is switched to the target CU and then the connection between the to-be-switched DU and the target CU is established, or the connection between the to-be-switched DU and the target CU is established and then the to-be-switched MT is switched to the target CU.

Because the first information includes the topological information, the target CU knows the nodes connected to the migrating node. In this way, it is able to facilitate the migration of the migrating node and its descendant nodes between the source CU and the target CU.

Because the first information includes the context information, it is able to switch the to-be-switched MT to the target CU without any necessity to obtain the context information through the interaction with respect to each node or each UE, thereby to simplify the signaling interaction process to some extent.

Based on the above, according to the embodiments of the present disclosure, at least one of the topological information or the context information is transmitted through the source CU to the target CU. The topological information includes the connection relationship between the migrating node and a descendant node of the migrating node in the source CU, or the connection relationship between the migrating node and a descendant node of the migrating node. The context information includes at least one of the node context information and the context information of the UEs, the node context information includes the context information of the migrating node and the context information of the descendant node of the migrating node, or includes at least one of the context information of the migrating node and the context information of the descendant node of the migrating node. The UEs include the UE connected to the migrating node and the UE connected to the descendant node of the migrating node, or include at least one of the UE connected to the migrating node and the UE connected to the descendant node of the migrating node. Through transmitting, by the source CU, at least one of the topological information or the context information to the target CU, it is unnecessary to perform the signaling interaction with respect to each UE when switching an IAB node between the CUs, thereby to simplify a signaling interaction process to some extent.

In a possible embodiment of the present disclosure, an Xn interface is provided between the source CU and the target CU, and the transmitting the first information to the target CU includes transmitting an Xn handover request message to the target CU, and the Xn handover request message carrying the first information.

In other words, the first information is carried in the Xn handover request message, and then the Xn handover request is transmitted by the source CU to the target CU. The first information includes at least one of the topological information and the context information, so at least one of the topological information and the context information is carried in the Xn handover request message.

In a possible embodiment of the present disclosure, no Xn interface is provided between the source CU and the target CU, the transmitting the first information to the target CU includes transmitting a handover preparation message to a core network, to enable the core network to transmit a handover request message to the target CU, and each of the handover preparation message and the handover request message carries the first information.

In other words, the first information is carried in the handover preparation message, and then the handover preparation message is transmitted by the source CU to the core network. Next, the first information is carried in the handover request message, and then the handover request message is transmitted by the core network to the target CU. In this way, at least one of the topological information and the context information is transmitted by the source CU to the target CU.

In a possible embodiment of the present disclosure, the first information further includes address information of the source CU, identification information of the migrating node in the source CU (e.g., PCI and CGI), identification information of the descendant node of the migrating node in the source CU (e.g., PCI and CGI), identification information of a second access node in the target CU (e.g., CGI), and identification information of a to-be-switched DU (e.g., CU ID). Alternatively, the first information further includes at least one of the address information of the source CU, the identification information of the migrating node in the source CU, the identification information of the descendant node of the migrating node in the source CU, the identification information of a second access node in the target CU, and the identification information of the to-be-switched DU. The second access node is an access node in the target path, and the to-be-switched DU includes a DU for the migrating node and a DU for the descendant node of the migrating node.

When the first information includes the address information of the source CU, the target CU determines a sender which transmits the first information, and then transmits information back to the source CU in accordance with the address information.

When the first information includes the address information of the migrating node in the source CU and the address information of the descendant node of the migrating node in the source CU, the target CU determines the nodes to be switched, and then assigns the address information of these nodes in the target CU for these nodes.

When the first information includes the address information of the second access node in the target CU, the target CU determines a node to which the MT for the migrating node and the MT for the descendant node of the migrating node access, so as to switch the MT for the migrating node and the MT for the descendant node to the target CU.

When the first information includes the identification information of the to-be-switched DU, the target CU determines the nodes for which the DUs need to be connected to the target CU, i.e., determines the nodes for which an F1-setup process needs to be performed.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In other words, the topological information is represented in the form of CGI (e.g., as shown in FIG. 12, a node represented by CGI6 and a node represented by CGI7 are connected to a node represented by CGI5), or in the form of PCI (e.g., as shown in FIG. 13, a node represented by PCI6 and a node represented by PCI7 are connected to a node represented by PCI5), or in the form of IP address (e.g., as shown in FIG. 14, a node represented by IP6 and a node represented by IP7 are connected to a node represented by IP5), or in the form of BAP layer address (e.g., as shown in FIG. 15, a node represented by BAP6 and a node represented by BAP7 are connected to a node represented by BAP5).

In a possible embodiment of the present disclosure, the information transmission method further includes receiving second information transmitted by the target CU. The second information includes at least one of address information of the target CU, identification information assigned by the target CU to the migrating node (including CGI, or including CGI and PCI), identification information assigned by the target CU to the descendant node of the migrating node (including CGI, or including CGI and PCI), or identification information of a second access node in the target CU (including CGI), and the second access node is an access node in the target path.

It should be appreciated that, after the migrating node and its descendant node have been migrated to the target CU, the CGI changes. Hence, the target CU needs to assign the CGIs for the migrating node and its descendant node. When there is a conflict between the PCI of the migrating node for the source CU and an existing PCI in the target CU, the target CU needs to re-assign the PCI for the migrating node. Identically, when there is a conflict between the PCI for the descendant node of the migrating node for the source CU and the existing PCI in the target CU, the target CU needs to re-assign the PCI for the descendant node of the migrating node.

When the second information includes the address information of the target CU, the source CU is capable of determining a node which has transmitted the second information.

When the second information includes the identification information assigned by the target CU to the migrating node and the identification information assigned by the target CU to the descendant node of the migrating node, the source CU is capable of determining the identification information of the migrating node and the descendant node in the target CU.

When the second information includes the identification information of the second access node in the target CU, the source CU is capable of determining a node to which the MT for the migrating node and the MT for the descendant node need to access, so as to switch the MT for the migrating node and the MT for the descendant node to the target CU.

In a possible embodiment of the present disclosure, an Xn interface is provided between the source CU and the target CU, and the receiving the second information transmitted by the target CU includes receiving an Xn handover request acknowledgement message carrying the second information transmitted by the target CU.

In other words, the second information is carried in the Xn handover request acknowledgement message, and then the Xn handover request acknowledgement message is transmitted by the target CU to the source CU. At least one of the address information of the target CU, the identification information assigned by the target CU to the migrating node, the identification information assigned by the target CU to the descendant node of the migrating node, or the identification information of the second access node in the target CU is carried in the Xn handover request acknowledgement message.

In a possible embodiment of the present disclosure, no Xn interface is provided between the source CU and the target CU, the receiving the second information transmitted by the target CU includes receiving a handover command message transmitted by a core network, the handover command message is transmitted by the core network upon the receipt of a handover request acknowledgement message transmitted by the target CU, and each of the handover request acknowledgement message and the handover command message carries the second information.

In other words, the second information is carried in the handover request acknowledgement message, and then the handover request acknowledgement message is transmitted by the target CU to the core network. Next, the second information is carried in the handover command message, and then the handover command message is transmitted by the core network to the source CU. In this way, it is able to transmit the second information by the target CU to the source CU.

In a possible embodiment of the present disclosure, the identification information includes one or more of a PCI, a CGI, or an IP address.

To be specific, the source CU uses the information transmission method to perform an IAB node group switching process through the following steps K1 to K7.

Step K1: the source CU receives a measurement report from a first access node, and the first access node is an access node in the source path.

Step K2: the source CU determines a target path to which the migrating node is switched in accordance with the measurement report.

In addition, the measurement report may be obtained in accordance with a position, a time and a load condition. For example, the measurement report includes a distance between the migrating node and the source CU, a signal intensity of the source CU at a position where the migrating node is located, a distance between the migrating node and the target CU, and a signal intensity of the target CU at the position where the migrating node is located. When the distance between the migrating node and the source CU is relatively large and the signal intensity of the source CU at the position where the migrating node is located is relatively weak, it is determined that the migrating node needs to be switched from the source CU to the other CU. When the distance between the migrating node and the target CU meets a predetermined condition and the signal intensity of the target CU at the position where the migrating node is located meets a predetermined condition, the migrating node and the descendant node need to be migrated to the target CU.

Step K3: the source CU interacts with the migrating node, the descendant node of the migrating node, and the target CU, so as to migrate the migrating node and the descendant node of the migrating node to the target CU.

Step K4: the source CU transmits the first information to the target CU. The first information includes the address information of the source CU, the identification information of the migrating node in the source CU, the identification information of the descendant node of the migrating node in the source CU, the identification information of the second access node in the target CU, the identification information of the to-be-switched DU, the topological information and the context information. The topological information includes a connection relationship between the migrating node and the descendant node of the migrating node. The context information includes at least one of node context information or context information of a UE. The node context information includes context information of the migrating node and context information of the descendant node of the migrating node.

Step K5: the source CU receives the second information transmitted by the target CU. The second information includes the address information of the target CU, the identification information assigned by the target CU to the migrating node, the identification assigned by the target CU to the descendant node of the migrating node, and the identification about the second access node in the target CU.

Step K6: the source CU interacts with the target CU and the to-be-switched MT, so as to switch the to-be-switched MT to the target CU. The to-be-switched MT includes an MT for the migrating node and an MT for the descendant node of the migrating node. The MT refers to a mobile terminal.

Step K7: the source CU interacts with the target CU and the to-be-switched DU, so as to establish the connection between the to-be-switched DU and the target CU.

In a possible embodiment of the present disclosure, there is an Xn interface between the source CU and the target CU. Prior to Step K7, the IAB node group switching process further includes: receiving a connection release indicator from the target CU; and releasing the connection between the source CU and the to-be-switched DU in accordance with the connection release indicator.

It should be appreciated that, a source F1 connection (i.e., the connection between the to-be-switched DU and the source CU) may be, or may not be, released. When the source F1 connection is not released, a new F1 connection (i.e., a connection between the to-be-switched DU and the target CU) is established, and meanwhile the source F1 connection and the new F1 connection are maintained. In addition, when the source F1 connection is not released, a connection on an original path is maintained by the to-be-switched MT. When the source F1 connection is released, the to-be-switched MT maintains its connection with both the target path and the source path, or it is completely switched to the target path.

In a possible embodiment of the present disclosure, there is no Xn interface between the source CU and the target CU. Prior to Step K7, the IAB node group switching process further includes: receiving a connection release indicator from the core network; and releasing the connection between the source CU and the to-be-switched DU in accordance with the connection release indicator.

When there is no Xn interface between the source CU and the target CU, the core network indicates the source CU to release the connection between the source CU and the to-be-switched DU.

In a possible embodiment of the present disclosure, Step K7 includes: receiving F1 interface configuration information transmitted by the target CU, the F1 interface configuration information includes F1 interface information configured by the target CU for the to-be-switched DU; and transmitting the F1 interface configuration information to a to-be-switched DU corresponding to the F1 interface configuration information, so that the to-be-switched DU establishes a connection between the to-be-switched DU and the target CU in accordance with the F1 interface configuration information.

When there is the Xn interface between the source CU and the target CU, the target CU transmits the F1 interface configuration information to the source CU, so that the source CU transmits the F1 interface configuration information to the to-be-switched DU corresponding to the F1 interface configuration information. The to-be-switched DU establishes the connection with the target CU in accordance with the received F1 interface configuration information, and after the connection has been established successfully, the to-be-switched D1 transmits a first migration confirmation message to the target CU.

In addition, when there is no Xn interface between the source CU and the target CU, the target CU transmits the F1 interface configuration information to the source CU, so that the source CU transmits the F1 interface configuration information to the to-be-switched DU corresponding to the F1 interface configuration information. The to-be-switched DU transmits a second migration confirmation message to the source CU, the source CU forwards the second migration confirmation message to the target CU, and then the to-be-switched DU establishes the connection between the to-be-switched DU and the target CU in accordance with the F1 interface configuration information.

In a possible embodiment of the present disclosure, Step K6 includes transmitting second information, a second RRC reconfiguration indicator and a data stopping indicator to the to-be-switched MT, so that the to-be-switched MT performs RRC reconfiguration in accordance with the second RRC reconfiguration indicator, generates a second RRC reconfiguration completion message, and forwards the second RRC reconfiguration completion message to the target CU through the second access node after the to-be-switched MT has accessed the second access node. Then, the target CU indicates the core network to switch the to-be-switched MT to the target CU. The second RRC reconfiguration indicator is used to indicate to perform the RRC reconfiguration in accordance with the second access node.

In other words, no matter whether there is the Xn interface between the source CU and the target CU, when the to-be-switched MT is switched to the target CU, the source CU transmits the second information, the second RRC reconfiguration indicator and the data stopping indication to the to-be-switched MT, so that the to-be-switched MT performs the RRC reconfiguration in accordance with the second reconfiguration indicator. After the reconfiguration has been completed, the to-be-switched MT randomly accesses the second access node, and transmits the second RRC reconfiguration completion message to the second access node, so that the second access node forwards the second RRC reconfiguration completion message to the target CU. Then, the target CU indicates the core network to switch the to-be-switched MT to the target CU.

After the to-be-switched MT has received the data stopping indicator, i.e., after the migrating node and its descendant node have received the data stopping indicator, the migrating node and the descendant node enter a service stopping state.

In a possible embodiment of the present disclosure, the transmitting the second information, the second RRC reconfiguration indicator and the data stopping indicator to the to-be-switched MT includes transmitting a downlink RRC transmission message to the first access node so that the first access node parses the downlink RRC transmission message and transmits information carried in the downlink RRC transmission message to the to-be-switched MT. The downlink RRC transmission message carries the second information, the second RRC reconfiguration indicator and the data stopping indicator.

In other words, the second information, the second RRC reconfiguration indicator and the data stopping indicator may be carried in the downlink RRC transmission message, and transmitted by the source CU to the first access node. After the information carried in the downlink RRC transmission message is parsed by the first access node, the first access node forwards the information to the to-be-switched DU.

An IAB node switching processing is performed by the migrating node using the information transmission method for the IAB node group switching in the embodiments of the present disclosure through the following steps L1 to L3.

Step L1: the migrating node transmits a measurement report to the first access node, so that the first access node forwards the measurement report to the source CU.

The first access node is an access node in a source path, and the source CU is a CU for a donor in the source path.

In addition, the measurement report is obtained in accordance with a position, a time and a load condition. For example, the measurement report includes a distance between the migrating node and the source CU, a signal intensity of the source CU at a position where the migrating node is located, a distance between the migrating node and the target CU, and a signal intensity of the target CU at the position where the migrating node is located. When the distance between the migrating node and the source CU is relatively large and the signal intensity of the source CU at the position where the migrating node is located is relatively weak, it is determined that the migrating node needs to be switched from the source CU to the other CU. When the distance between the migrating node and the target CU meets a predetermined condition and the signal intensity of the target CU at the position where the migrating node is located meets a predetermined condition, the migrating node and the descendant node need to be migrated to the target CU.

Step L2: after the source CI determines the target path to be switched by the migrating node in accordance with the measurement report, the migrating node interacts with the source CU and the target CU, so as to migrate the migrating node to the target CU. The target CU is a CU for a donor in the target path.

Step L3: the migrating node interacts with the target CU and the UEs, and performs RRC reconfiguration on the UE through the target CU.

The UEs include a UE connected to the migrating node and a UE connected to the descendant node of the migrating node.

In a possible embodiment of the present disclosure, the interacting with the source CU and the target CU so as to migrate the migrating node to the target CU includes: after the source CU has received the second information, interacting, by an MT for the migrating node, with the source CU, so as to switch the MT for the migrating node to the target CU, the second information includes the address information of the target CU, the identification information assigned by the target CU to the migrating node, the address information of the second access node in the target CU, the MT being a mobile terminal, the second access node being an access node in the target path; and interacting, by a DU for the migrating node, with the target CU, so as to establish a connection between the DU for the migrating node and the target CU.

When the second information includes the address information of the target CU, the source CU is capable of determining a node which has transmitted the second information.

When the second information includes the identification information assigned by the target CU to the migrating node and the identification information assigned by the target CU to the descendant node of the migrating node, the source CU is capable of determining the identification information of the migrating node and its descendant node in the target CU.

When the second information includes the address information of the second access node in the target CU, the source CU is capable of determining a node to which the MT for the migrating node and the MT for its descendant node need to randomly access, so as to switch the MT for the migrating node and the MT for the descendant node to the target CU.

It should be appreciated that, an order of the process of switching the to-be-switched MT to the target CU and the process of establishing the connection between the to-be-switched DU and the target CU will not be particularly defined herein, i.e., the to-be-switched MT is switched to the target CU and then the connection between the to-be-switched DU and the target CU is established, or the connection between the to-be-switched DU and the target CU is established and then the to-be-switched MT is switched to the target CU.

In a possible embodiment of the present disclosure, the interacting, by the MT for the migrating node, with the source CU so as to switch the MT for the migrating node to the target CU includes: receiving the second information, the second RRC reconfiguration indicator and the data stopping indicator from the source CU; performing RRC reconfiguration in accordance with the second RRC reconfiguration indicator, and generating the second RRC reconfiguration completion message after the RRC reconfiguration is completely; interacting, by the MT for the migrating node, with the second access node in accordance with the second information and the second access node, so as to randomly access the second access node; and transmitting the second RRC reconfiguration completion message to the second access node, so that the second access node forwards the second RRC reconfiguration completion message to the target CU, and the target CU indicates the core network to switch the MT for the migrating node to the target CU.

In other words, no matter whether there is the Xn interface between the source CU and the target CU, when the to-be-switched MT is switched to the target CU, the source CU transmits the second information, the second RRC reconfiguration indicator and the data stopping indication to the to-be-switched MT, so that the to-be-switched MT performs the RRC reconfiguration in accordance with the second reconfiguration indicator and the second access node. After the reconfiguration has been completed, the to-be-switched MT accesses the second access node, and transmits the second RRC reconfiguration completion message to the second access node, so that the second access node forwards the second RRC reconfiguration completion message to the target CU. Then, the target CU indicates the core network to switch the to-be-switched MT to the target CU.

In a possible embodiment of the present disclosure, there is an Xn interface between the source CU and the target CU. The interacting, by the DU for the migrating node, with the target CU so as to establish the connection between the DU for the migrating node and the target CU includes: after the to-be-switched MT has been switched to the target CU, transmitting an F1 connection setup request message to the target CU, the F1 connection setup request message carrying identification information of the DU for the migrating node; and receiving an F1 connection setup response message transmitted by the target CU, the F1 connection setup response message being generated after the connection between the target CU and the DU for the migrating node is established in accordance with the F1 connection setup request message. Alternatively, the interacting, by the DU for the migrating node, with the target CU so as to establish the connection between the DU for the migrating node and the target CU includes: receiving F1 interface configuration information forwarded by the source CU for the target CU, the F1 interface configuration information including F1 interface information configured by the target CU for the DU for the migrating node; establishing, by the DU for the migrating node, a connection between the DU for the migrating node and the target CU through the source CU in accordance with the F1 interface configuration information; and transmitting a first migration confirmation message to the target CU, the first migration confirmation message being used to indicate that the connection between the DU for the migrating node and the target CU has been established.

Alternatively, the interacting, by the DU for the migrating node, with the target CU so as to establish the connection between the DU for the migrating node and the target CU includes: receiving the F1 interface configuration information forwarded by the source CU for the target CU, the F1 interface configuration information including the F1 interface information configured by the target CU for the DU for the migrating node; and transmitting, by the DU for the migrating node, a second migration confirmation message to the source CU, and establishing, by the DU for the migrating node after the source CU has forwarded the second migration confirmation message to the target CU, the connection between the DU for the migrating node and the target CU through the source CU in accordance with the F1 interface configuration information, the second migration confirmation message being used to indicate the DU for the migrating node to establish the connection between the DU for the migrating node and the target CU in accordance with the F1 interface configuration information.

To be specific, based on the above, when there is the Xn interface between the source CU and the target CU, the connection between the to-be-switched DU and the target CU is established through any of the following three modes.

First mode: after the to-be-switched MT has been switched to the target CU, the to-be-switched DU transmits the F1 connection setup request message to the target CU, so as to enable the target CU to establish the connection with the to-be-switched DU in accordance with the F1 connection setup request message, thereby to transmit the F1 connection setup response message to the to-be-switched DU.

Second mode: after the source CU has transmitted the Xn handover request message to the target CU, the target CU transmits the F1 interface configuration information to the source CU, so that the source CU transmits the F1 interface configuration information to the to-be-switched DU corresponding to the F1 interface configuration information. The to-be-switched DU establishes the connection with the target CU in accordance with the received F1 interface configuration information, and after the connection has been established successfully, the to-be-switched DU transmits the first migration confirmation message to the target CU.

Third mode: after the source CU has transmitted the Xn handover request message to the target CU, the target CU transmits the F1 interface configuration information to the source CU, so that the source CU transmits the F1 interface configuration information to the to-be-switched DU corresponding to the F1 interface configuration information. The to-be-switched DU transmits the second migration confirmation message to the source CU, and the source CU forwards the second migration confirmation message to the target CU. Then, the to-be-switched DU establishes the connection between the to-be-switched DU and the target CU in accordance with the F1 interface configuration information.

In a possible embodiment of the present disclosure, there is no Xn interface between the source CU and the target DU. The interacting, by the DU for the migrating node, with the target DU so as to establish the connection between the DU for the migrating node and the target CU includes: after the to-be-switched MT has been switched to the target CU, transmitting an F1 connection setup request message to the target CU, the F1 connection setup request message carrying identification information of the DU for the migrating node; and receiving an F1 connection setup response message transmitted by the target CU, the F1 connection setup response message being generated after the target CU establishes the connection with the DU for the migrating node in accordance with the F1 connection setup request message. Alternatively, the interacting, by the DU for the migrating node, with the target DU so as to establish the connection between the DU for the migrating node and the target CU includes: receiving F1 interface configuration information forwarded by the core network for the target CU, the F1 interface configuration information including F1 interface information configured by the target CU for the DU for the migrating node; establishing, by the DU for the migrating node, the connection between the DU for the migrating node and the target CU through the source CU in accordance with the F1 interface configuration information; and transmitting a first migration confirmation message to the target CU, the first migration confirmation message being used to indicate that the connection between the DU for the migrating node and the target CU has been established. Alternatively, the interacting, by the DU for the migrating node, with the target DU so as to establish the connection between the DU for the migrating node and the target CU includes: receiving the F1 interface configuration information forwarded by the core network for the target CU, the F1 interface configuration information including the F1 interface information configured by the target CU for the DU for the migrating node; and transmitting, by the DU for the migrating node, a second migration confirmation message to the source CU, and establishing, by the DU for the migrating node after the source CU forwards the second migration confirmation message to the core network and the core network forwards the second migration confirmation message to the target CU, the connection between the DU for the migrating node and the target CU through the source CU in accordance with the F1 interface configuration information, the second migration confirmation message being used to indicate the DU for the migrating node to establish the connection between the DU for the migrating node and the target CU in accordance with the F1 interface configuration information.

To be specific, based on the above, when there is no Xn interface between the source CU and the target CU, the connection between the to-be-switched DU and the target CU is established through any of the following three modes.

First mode: after the to-be-switched MT has been switched to the target CU, the to-be-switched DU transmits the F1 connection setup request message to the target CU, so as to enable the target CU to establish the connection with the to-be-switched DU in accordance with the F1 connection setup request message, thereby to transmit the F1 connection setup response message to the to-be-switched DU.

Second mode: after the core network has transmitted the handover request message to the target CU, the target CU transmits the F1 interface configuration information to the core network, so that the core network forwards the F1 interface configuration information to the source CU, and the source CU forwards the F1 interface configuration information to the to-be-switched DU corresponding to the F1 interface configuration information. The to-be-switched DU establishes the connection with the target CU in accordance with the received F1 interface configuration information, and after the connection has been established successfully, the to-be-switched DU transmits the first migration confirmation message to the target CU.

Third mode: after the core network has transmitted the handover request message to the target CU, the target CU transmits the F1 interface configuration information to the core network, to enable the core network to transmit the F1 interface configuration information to the source CU and the source CU transmits the F1 interface configuration information to the to-be-switched DU corresponding to the F1 interface configuration information. The to-be-switched DU transmits the second migration confirmation message to the source CU, the source CU forwards the second migration confirmation message to the core network, and the core network forwards the second migration confirmation message to the target CU. Then, the to-be-switched DU establishes the connection between the to-be-switched DU and the target CU in accordance with the received F1 interface configuration information.

In a possible embodiment of the present disclosure, the interacting with the target CU and the UE and performing the RRC reconfiguration on the UE through the target CU includes: receiving a first RRC reconfiguration indicator from the target CU, the first RRC reconfiguration indicator being used to indicate the UE to perform the RRC reconfiguration through the target CU; forwarding the first RRC reconfiguration indicator to the UE; receiving a first RRC reconfiguration completion message from the UE after the RRC reconfiguration; and transmitting the first RRC reconfiguration completion message to the target CU, so that the target CU indicates the core network to switch the data transmission path for the UE to be target CU.

In other words, after the migrating node and its descendant node have been migrated to the target CU, the target CU transmits the first RRC reconfiguration indicator to the migrating node, so that the migrating node forwards the first RRC reconfiguration indicator to the UE. The UE performs the RRC reconfiguration in accordance with the first RRC reconfiguration indicator and the target CU, generates the first RRC reconfiguration completion message after the reconfiguration has been completed, and transmits the first RRC reconfiguration completion message to the migrating node. The migrating node transmits the first RRC reconfiguration completion message to the target CU, so that the target CU indicates the core network to switch the data transmission path for the UE to the target CU.

In a word, the implementation of the IAB node group switching process using the information transmission method in the IAB node group switching will be described as follows.

First Embodiment: when there is an Xn interface between the source CU and the target CU, the switching of the MT is performed, then a new F1 connection is established, and then the switching of the UE is performed.

Figure 5:
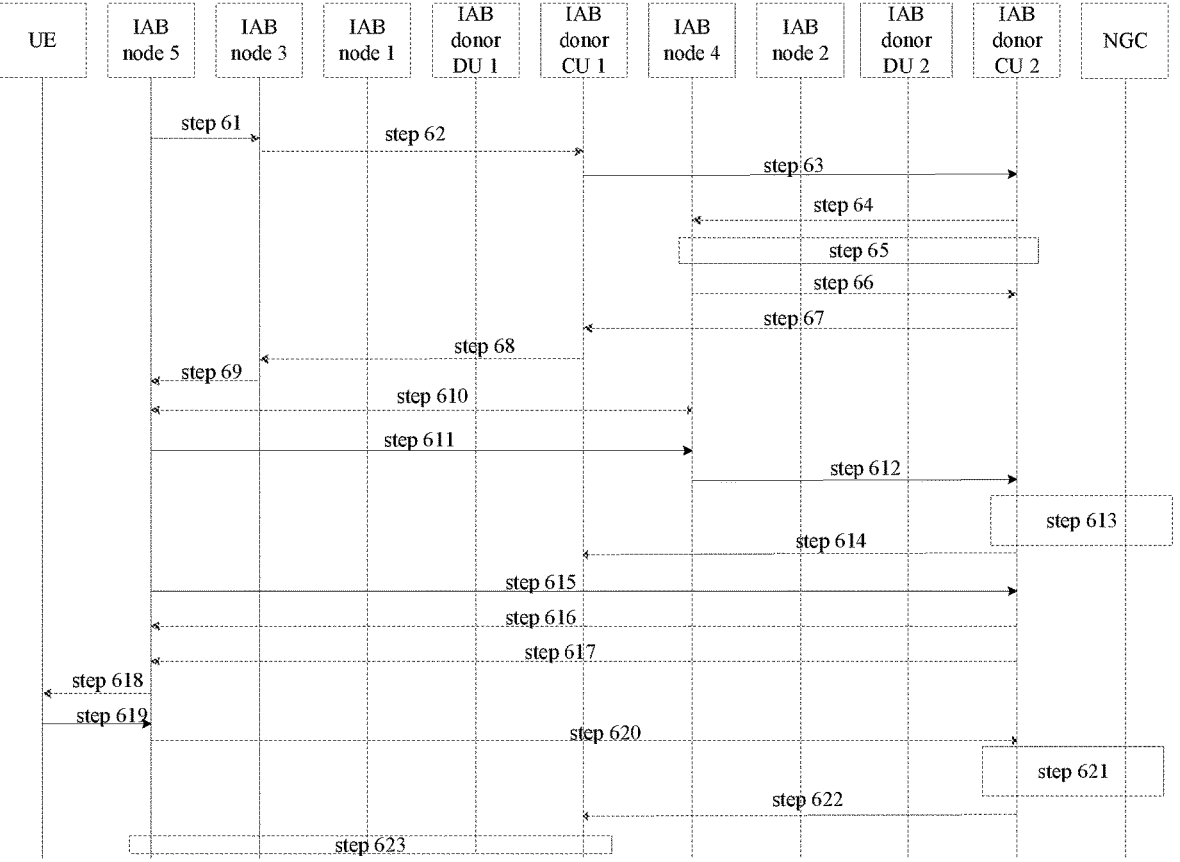
FIG. 5 is a schematic view showing a process of the IAB node group switching using the information transmission method according to an embodiment of the present disclosure.

As shown in FIG. 5, a process of switching an IAB node 5 from an IAB donor CU 1 to an IAB donor CU 2 includes the following steps 61 to 623.

Step 61: an MT for the IAB node 5 reports a measurement report to an IAB node 3. The measurement report is obtained through measurement in accordance with a position, a time and a load condition.

Step 62: the IAB node 3 transmits an uplink RRC transfer message carrying the measurement report to the IAB donor CU 1.

Step 63: upon the receipt of the measurement report, the IAB donor CU 1 decides to switch, and transmits an Xn handover request to the IAB donor CU 2. The Xn handover request carries an address of the IAB donor CU 1, PCIS and CGIs of the IAB node 5 and its descendant node in the IAB donor CU 1, a CGI of an IAB node 4 in the IAB donor CU 2, topological information of the IAB node 5 and its descendant node under the IAB donor CU 1, a DU ID of the IAB node 5, a DU ID of the descendant node of the IAB node 5, and a UE context list. In a possible embodiment of the present disclosure, the Xn handover request further carries IP address information of the IAB node 5 and its descendant node under the IAB donor CU 1. The topological information includes a connection relationship between the IAB node 5 and its descendant node. The UE context list includes context information of the IAB node 5 and its descendant node, and/or context information of a UE under the IAB node 5 and a UE under its descendant node.

Step 64: upon the receipt of the Xn handover request, the IAB donor CU 2 starts to initiate a UE context setup request to the IAB node 4, and the UE context setup request carries topological information of the IAB node 5 and its descendant node under the IAB donor CU 1 as well as the UE context list.

Step 65: new route information and a mapping rule are added on a new path (i.e., IAB donor CU 2, IAB donor DU 2, IAB node 4 and IAB node 2). It should be appreciated that, a new route and the mapping rule are added in this step at the earliest, or added subsequent to Step 620.

Step 66: the IAB node 4 transmits a UE context setup response to the IAB donor CU 2.

Step 67: the IAB donor CU 2 transmits an Xn handover request ACK to the IAB donor CU 1, and the Xn handover request ACK carries an address of the IAB donor CU 2, a CGI assigned for the IAB node 5 at the IAB donor CU 2, a CGI assigned for the descendent node of the IAB node 5 at the IAB donor CU 2, a CGI of the IAB node 4 at the IAB donor CU 2, and an RRC reconfiguration message of the IAB node 5. In a possible embodiment of the present disclosure, when the PCI and the IP address have been assigned for the IAB node 5 at the IAB donor CU 2, the Xn handover request ACK may also carry the PCI and the IP address information assigned for the TAB node 5 at the IAB donor CU 2. In a possible embodiment of the present disclosure, when the PCI and the IP address have been assigned for the descendent node of the TAB node 5 at the IAB donor CU 2, the Xn handover request ACK may further carry the PCI and the IP address information assigned for the descendent node of the TAB node 5 at the IAB donor CU 2.

Step 68: the IAB donor CU 1 transmits downlink (DL) RRC transfer to the TAB node 3, and the downlink RRC transfer carries an RRC reconfiguration indicator (obtained in Step 67), a data stopping indicator, the address of the IAB donor CU 2, the CGI assigned for the TAB node 5 at the IAB donor CU 2, the CGI assigned for the descendent node of the TAB node 5 at the IAB donor CU 2, and the CGI of the TAB node 4 at the IAB donor CU 2. In a possible embodiment of the present disclosure, when the PCI and the IP address information have been assigned for the TAB node 5 at the IAB donor CU 2, the DL RRC transfer may further carry the PCI and the IP address information assigned for the TAB node 5 at the IAB donor CU 2. In a possible embodiment of the present disclosure, when the PCI and the IP address have been assigned for the descendent node of the TAB node 5 at the IAB donor CU 2, the DL RRC transfer may further carry the PCI and the IP address have been assigned for the descendent node of the TAB node 5 at the IAB donor CU 2. Here, the RRC reconfiguration indicator is used to indicate to perform the RRC reconfiguration through the TAB node 5.

Step 69: the TAB node 3 parses the information carried in the DL RRC transfer, and transmits the RRC reconfiguration message carried in the DL RRC transfer to the MT for the TAB node 5.

Step 610: the MT for the TAB node 5 accesses the TAB node 4.

Step 611: the MT for the TAB node 5 transmits RRC reconfiguration complete to the TAB node 4.

Step 612: the TAB node 4 forwards the RRC reconfiguration complete from the TAB node 5 to the IAB donor CU 2.

Step 613: the core network (NGC) switches a data transmission path for the MT for the IAB node 5 to the IAB donor CU 2.

Step 614: the IAB donor CU 2 transmits an F1 connection release indicator (release F1 connection) to the IAB donor CU 1, so that the IAB donor CU 1 releases a source F1 connection (i.e., a connection between the IAB donor CU 1 and the DU for the IAB node 5).

Here, it should be appreciated that, Step 614 is optional, i.e., the source F1 connection may be, or may not be, released.

Step 615: the IAB node 5 transmits an F1 connection setup request carrying a respective gnb-DU ID. In a possible embodiment of the present disclosure, the F1 connection setup request may further carry the respective quantity of UEs connected thereto and a respective throughput thereof.

Step 616: the IAB donor CU 2 transmits an F1 connection setup response to the IAB node 5.

At this time, the migration of the IAB node 5 has been completed, and the migration of the UE under the IAB node 5 will be performed from Step 617.

Step 617: the IAB donor CU 2 transmits a UE context modification request carrying RRC configuration to the IAB node 5 through the IAB donor CU 1. Here, the RRC configuration is used to indicate the UE to perform the RRC reconfiguration through the IAB donor CU 2.

Step 618: the IAB node 5 forwards the RRC configuration in Step 617 to the UE under the IAB node 5.

Step 619: the UE under the IAB node 5 performs the RRC reconfiguration through the IAB donor CU 2, and transmits RRC reconfiguration complete to the IAB node 5 after the reconfiguration.

Step 620: the IAB node 5 transmits the RRC reconfiguration complete to the IAB donor CU 2 through a UE context modification response.

Step 621: the core network switches a data transmission path for the UE under the IAB node 5 to the IAB donor CU 2.

Step 622: the IAB donor CU 2 transmits UE context release to the IAB donor CU 1, so that the IAB donor CU 1 deletes UE context about the UE under the IAB node 5.

Step 623: route information of the source path is updated.

The Steps 61 to 613 relate to an MT switching process, Steps 614 to 616 relate to a process of releasing the source F1 connection and establishing the new F1 connection, and Steps 617 to 621 relate to a UE switching process.

Second Embodiment: when there is no Xn interface between the source CU and the target CU, the switching of the MT is performed, then a new F1 connection is established, and then the switching of the UE is performed.

Figure 6:
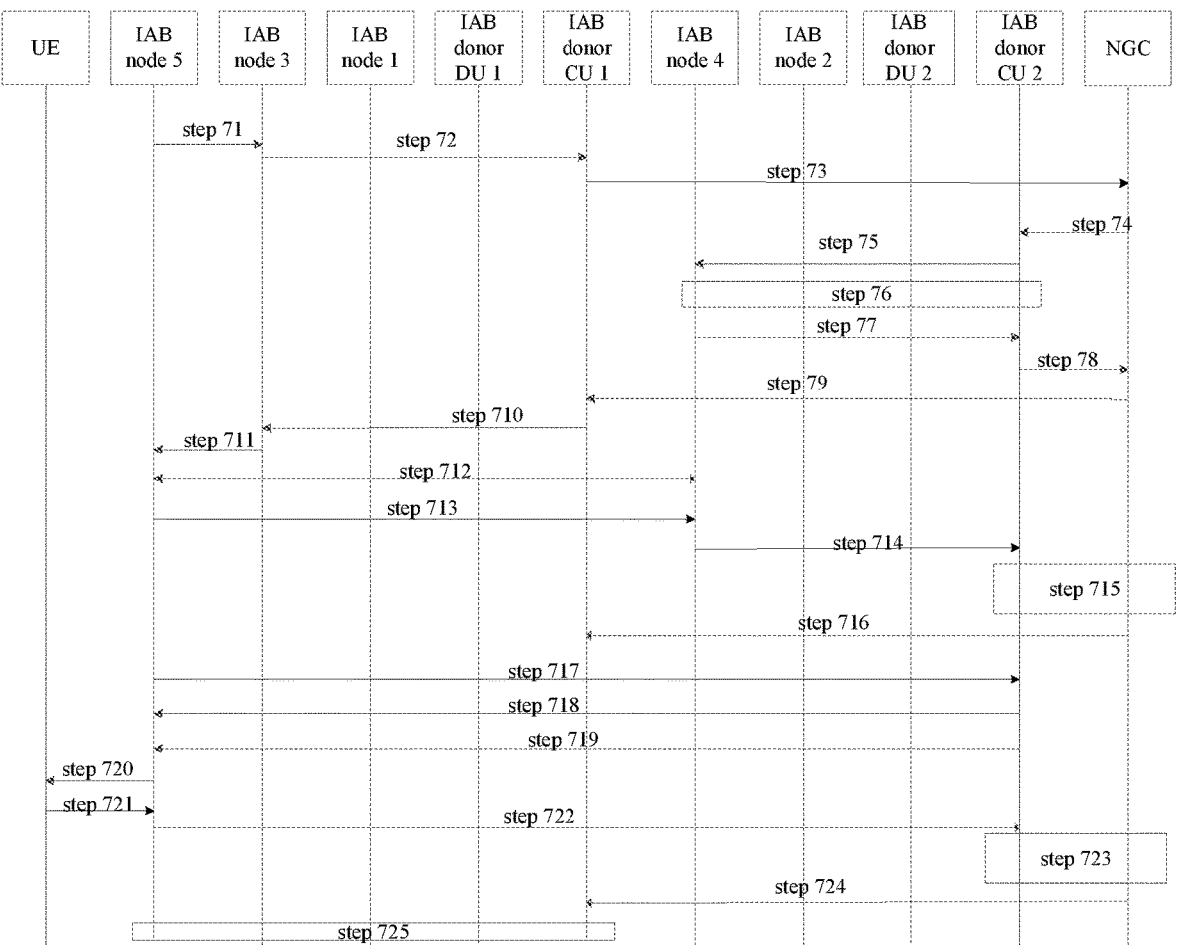
FIG. 6 is another schematic view showing the process of the IAB node group switching using the information transmission method according to an embodiment of the present disclosure.

As shown in FIG. 6, a process of switching an IAB node 5 from CU 1 to CU 2 includes the following steps 71 to 725.

Step 71: an MT for the IAB node 5 reports a measurement report to an IAB node 3. The measurement report is obtained in accordance with a position, a time and a load condition.

Step 72: the IAB node 3 transmits an uplink RRC transfer message carrying the measurement report to the IAB donor CU 1.

Step 73: the IAB donor CU 1 transmits a handover required message to the core network. The handover required message carries an address of the IAB donor CU 1, PCIS and CGIs of the IAB node 5 and its descendant node in the IAB donor CU 1, a CGI of an IAB node 4 in the IAB donor CU 2, topological information of the IAB node 5 and its descendant node under the IAB donor CU 1, a DU ID of the IAB node 5, a DU ID of the descendant node of the IAB node 5, and a UE context list. In a possible embodiment of the present disclosure, the handover required message further carries IP address information of the IAB node 5 and its descendant node under the IAB donor CU 1. The topological information includes a connection relationship between the IAB node 5 and its descendant node. The UE context list includes context information of the IAB node 5 and its descendant node, and/or context information of a UE under the IAB node 5 and a UE under its descendant node.

Step 74: the core network transmits a handover request to the IAB donor CU 2. The handover request carries the address of the IAB donor CU 1, the PCIs and CGIs of the IAB node 5 and its descendant node in the IAB donor CU 1, the CGI of an IAB node 4 in the IAB donor CU 2, the topological information of the IAB node 5 and its descendant node under the IAB donor CU 1, the DU ID of the IAB node 5, the DU ID of the descendant node of the IAB node 5, and the UE context list. In a possible embodiment of the present disclosure, the handover request may further carry IP address information of the IAB node 5 and its descendant node under the IAB donor CU 1. The topological information includes a connection relationship between the IAB node 5 and its descendant node. The UE context list includes context information of the IAB node 5 and its descendant node, and/or context information of a UE under the IAB node 5 and a UE under its descendant node.

Step 75: the IAB donor CU 2 starts to initiate a UE context setup request to the IAB node 4, and the UE context setup request carries topological information of the IAB node 5 and its descendant node under the IAB donor CU 1 as well as the UE context list.

Step 76: new route information and a mapping rule are added on a new path (i.e., IAB donor CU 2, IAB donor DU 2, IAB node 4 and IAB node 2). It should be appreciated that, a new route and the mapping rule are added in this step at the earliest, or added subsequent to Step 722.

Step 77: the IAB node 4 transmits a UE context setup response to the IAB donor CU 2.

Step 78: the IAB donor CU 2 transmits a handover request ACK to the core network, and the handover request ACK carries an address of the IAB donor CU 2, a CGI assigned for the IAB node 5 at the IAB donor CU 2, a CGI assigned for the descendent node of the IAB node 5 at the IAB donor CU 2, a CGI of the IAB node 4 at the IAB donor CU 2, and an RRC reconfiguration message of the IAB node 5. In a possible embodiment of the present disclosure, when the PCI and the IP address have been assigned for the IAB node 5 at the IAB donor CU 2, the handover request ACK may also carry the PCI and the IP address information assigned for the IAB node 5 at the IAB donor CU 2. In a possible embodiment of the present disclosure, when the PCI and the IP address have been assigned for the descendent node of the IAB node 5 at the IAB donor CU 2, the handover request ACK may further carry the PCI and the IP address information assigned for the descendent node of the IAB node 5 at the IAB donor CU 2.

Step 79: the core network transmits a handover command to the IAB donor CU 1, and the handover command carries the address of the IAB donor CU 2, the CGI assigned for the IAB node 5 at the IAB donor CU 2, the CGI assigned for the descendent node of the IAB node 5 at the IAB donor CU 2, the CGI of the IAB node 4 at the IAB donor CU 2, and the RRC reconfiguration message of the IAB node 5. In a possible embodiment of the present disclosure, when the PCI and the IP address have been assigned for the IAB node 5 at the IAB donor CU 2, the handover command may further carry the PCI and the IP address assigned for the IAB node 5 at the IAB donor CU 2. In a possible embodiment of the present disclosure, when the PCI and the IP address have been assigned for the descendent node of the IAB node 5 at the IAB donor CU 2, the handover command may further carry the PCI and the IP address have been assigned for the descendent node of the IAB node 5 at the IAB donor CU 2.

Step 710: the IAB donor CU 1 transmits DL RRC transfer to the IAB node 3, and the DL RRC transfer carries an RRC reconfiguration indicator (obtained in Step 79), a data stopping indicator, the address of the IAB donor CU 2, the CGI assigned for the IAB node 5 at the IAB donor CU 2, the CGI assigned for the descendent node of the IAB node 5 at the IAB donor CU 2, and the CGI of the IAB node 4 at the IAB donor CU 2. In a possible embodiment of the present disclosure, when the PCI and the IP address information have been assigned for the IAB node 5 at the IAB donor CU 2, the DL RRC transfer may further carry the PCI and the IP address information assigned for the IAB node 5 at the IAB donor CU 2. In a possible embodiment of the present disclosure, when the PCI and the IP address have been assigned for the descendent node of the IAB node 5 at the IAB donor CU 2, the DL RRC transfer may further carry the PCI and the IP address have been assigned for the descendent node of the IAB node 5 at the IAB donor CU 2. Here, the RRC reconfiguration indicator is used to indicate to perform the RRC reconfiguration through the IAB node 5.

Step 711: the IAB node 3 parses the information carried in the DL RRC transfer, and transmits the RRC reconfiguration message carried in the DL RRC transfer to the MT for the IAB node 5.

Step 712: the MT for the IAB node 5 accesses the IAB node 4.

Step 713: the MT for the IAB node 5 transmits RRC reconfiguration complete to the IAB node 4.

Step 714: the IAB node 4 forwards the RRC reconfiguration complete from the IAB node 5 to the IAB donor CU 2.

Step 715: the core network switches a data transmission path for the MT for the IAB node 5 to the IAB donor CU 2.

Step 716: the IAB donor CU 2 transmits an F1 connection release indicator (release F1 connection) to the IAB donor CU 1, so that the IAB donor CU 1 releases a source F1 connection (i.e., a connection between the IAB donor CU 1 and the DU for the IAB node 5).

Here, it should be appreciated that, Step 716 is optional, i.e., the source F1 connection may be, or may not be, released.

Step 717: the IAB node 5 transmits an F1 connection setup request carrying a gnb-DU ID. In a possible embodiment of the present disclosure, the F1 connection setup request may further carry the quantity of UEs connected thereto and a throughput thereof.

Step 718: the IAB donor CU 2 transmits an F1 connection setup response to the IAB node 5.

At this time, the migration of the IAB node 5 has been completed, and the migration of the UE under the IAB node 5 will be performed from Step 719.

Step 719: the IAB donor CU 2 transmits a UE context modification request carrying RRC configuration to the IAB node 5 through the IAB donor CU 1. Here, the RRC configuration is used to indicate the UE to perform the RRC reconfiguration through the IAB donor CU 2.

Step 720: the IAB node 5 forwards the RRC configuration in Step 719 to the UE under the IAB node 5.

Step 721: the UE under the IAB node 5 performs the RRC reconfiguration through the IAB donor CU 2, and transmits RRC reconfiguration complete to the IAB node 5 after the reconfiguration.

Step 722: the IAB node 5 transmits the RRC reconfiguration complete to the IAB donor CU 2 through a UE context modification response.

Step 723: the core network switches a data transmission path for the UE under the IAB node 5 to the IAB donor CU 2.

Step 724: the IAB donor CU 2 transmits UE context release to the IAB donor CU 1, so that the IAB donor CU 1 deletes UE context about the UE under the IAB node 5.

Step 725: route information of the source path is updated.

The Steps 71 to 715 relate to an MT switching process, Steps 716 to 718 relate to a process of releasing the source F1 connection and establishing the new F1 connection, and Steps 719 to 725 relate to a UE switching process.

Based on the above first and second embodiments, when there is the Xn interface between the IAB donor CU 1 and the IAB donor CU 2, the UE context list includes at least one of the context information of the IAB node 5, the context information of its descendant node, the context information of the UE under the IAB node 5, and the context information of the UE under the descendant node. The UE context list and the topological information of the IAB node 5 and the descendant node in the IAB donor CU 1 is transmitted from the IAB donor CU 1 to the IAB donor CU 2 through the Xn handover request. The IAB donor CU 2 transmits the UE context list and the topological information to an access node in the target path to which the IAB node 5 is to be switched (i.e., the IAB node 4). At this time, the IAB donor CU 1 starts to update the route information in accordance with the IAB node 5 to be accessed. The IAB node 4 knows the UE context list, and then performs configuration and relevant scheduling for the IAB node 5 and the UE, e.g., establishes one or more bearers for the signaling or data transmission. The IAB donor CU 1 transmits configuration information to the MT for the IAB node 5, and stops the data transmission for the IAB node 5. After the configuration, the MT for the IAB node 5 starts to perform initial access and is switched to the IAB donor CU 2, and the path switching is performed from a core network side. Next, the F1 setup process is performed. The IAB node 5 needs to perform the F1 setup, i.e., establish the connection between the DU for the IAB node 5 and the IAB donor CU 2.

After the F1 setup, the UE switching process is started. The IAB donor CU 2 transmits the UE context modification request carrying the RRC reconfiguration message to the IAB node 5. The IAB node 5 notifies, through the RRC reconfiguration message, the UE under each IAB node 5 to be reconfigured. After the reconfiguration, an uplink from the UE to the core network is enabled. Next, a path switching process of the core network is performed. At this time, uplink/downlink data transmission is performed between the UE under the IAB node 5 and the core network. Then, the IAB donor CU 2 indicates the IAB donor CU 1 to release the UE context about the UE under the IAB node 5, and updates the route information of the IAB donor CU 1.

In the circumstance where there is no Xn interface between the IAB donor CU 1 and the IAB donor CU 2, the above process is also applicable, with a difference in that the UE context list and the topological information are transmitted through the handover required message and the handover request.

Third Embodiment: when there is an Xn interface between the source CU and the target CU, the switching of the MT is performed, then a new F1 connection is established, and then the switching of the UE is performed.

Figure 7:
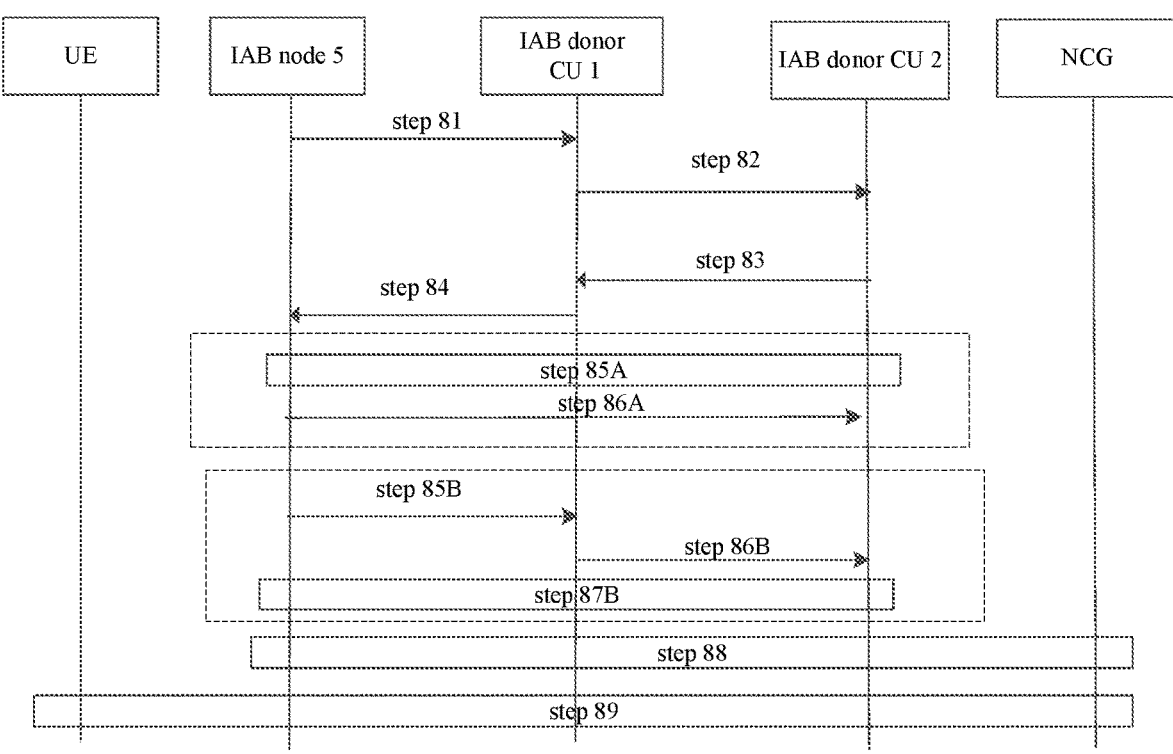
FIG. 7 is yet another schematic view showing the process of the IAB node group switching using the information transmission method according to an embodiment of the present disclosure.

As shown in FIG. 7, a process of switching an IAB node 5 from a CU 1 to a CU 2 includes the following steps 81 to 89.

Step 81: an MT for the IAB node 5 transmits a measurement report to the IAB donor CU 1 through UL RRC transfer, and the measurement report is obtained in accordance with a position, a time and a load condition.

Step 82: the IAB node CU 1 transmits an Xn handover request to an IAB donor CU 2. The Xn handover request carries an address of the IAB donor CU 1, PCIS, CGIs and IP addresses of the IAB node 5 and its descendant node in the IAB donor CU 1, a CGI of an IAB node 4 in the IAB donor CU 2, topological information of the IAB node 5 and its descendant node under the IAB donor CU 1, a DU ID of the IAB node 5, a DU ID of the descendant node of the IAB node 5, and a UE context list. The topological information includes a connection relationship between the IAB node 5 and its descendant node. The UE context list includes context information of the IAB node 5 and its descendant node, and/or context information of a UE under the IAB node 5 and a UE under its descendant node.

Step 83: the IAB donor CU 2 replies an Xn handover request ACK to the IAB donor CU 1, and the Xn handover request ACK carries an address of the IAB donor CU 2, a CGI assigned for the IAB node 5 at the IAB donor CU 2, a CGI assigned for the descendent node of the IAB node 5 at the IAB donor CU 2, a CGI of the IAB node 4 at the IAB donor CU 2, and F1 interface information configured by the IAB donor CU 2 for the DUs of the IAB node 5 and its descendant node. In a possible embodiment of the present disclosure, when the PCI and the IP address have been assigned for the IAB node 5 at the IAB donor CU 2, the Xn handover request ACK may also carry the PCI and the IP address information assigned for the IAB node 5 at the IAB donor CU 2. In a possible embodiment of the present disclosure, when the PCI and the IP address have been assigned for the descendent node of the IAB node 5 at the IAB donor CU 2, the Xn handover request ACK may further carry the PCI and the IP address information assigned for the descendent node of the IAB node 5 at the IAB donor CU 2.

Step 84: the IAB donor CU 1 transmits a UE context modification request to the IAB node 5. The UE context modification request transmitted to the IAB node 5 carries the F1 interface information configured by the IAB donor CU 2 for the DU of the IAB node 5.

Steps 85A to 86A, or steps 85B to 87B, are performed subsequent to Step 84.

Step 85A: the IAB node 5 establishes a connection between the DU for the IAB node 5 and the IAB donor CU 2 through the IAB donor CU 1 or an IAB donor DU 1 in accordance with the received F1 interface configuration information.

Step 86A: the IAB node 5 transmits a UE context modification response carrying migration confirm to the IAB donor CU 2.

Step 85B: the IAB node 5 transmits the UE context modification response carrying the migration confirm to the IAB donor CU 1.

Step 86B: the IAB donor CU 1 forwards the migration confirm to the IAB donor CU 2.

Step 87B: the IAB node 5 establishes a connection between the DU for the IAB node 5 and the IAB donor CU 2 through the IAB donor CU 1 in accordance with the received F1 interface configuration information.

Steps 88 and 89 are performed subsequent to Steps 85A to 86A, or subsequent to Steps 85B to 87B.

Step 88: interaction is performed among the IAB node 5, the IAB donor CU 1, the IAB donor CU 2 and the core network, so as to switch the MT for the IAB node 5 to the IAB donor CU 2.

Step 89: interaction is performed among the IAB node 5, the IAB donor CU 1, the IAB donor CU 2, the UE under the IAB node 5 and the core network, so as to switch a data transmission path for the UE under the IAB node 5 to the IAB donor CU 2.

Fourth Embodiment: when there is no Xn interface between the source CU and the target CU, a new F1 connection is established, then the switching of the MT is performed, and then the switching of the UE is performed.

Figure 8:
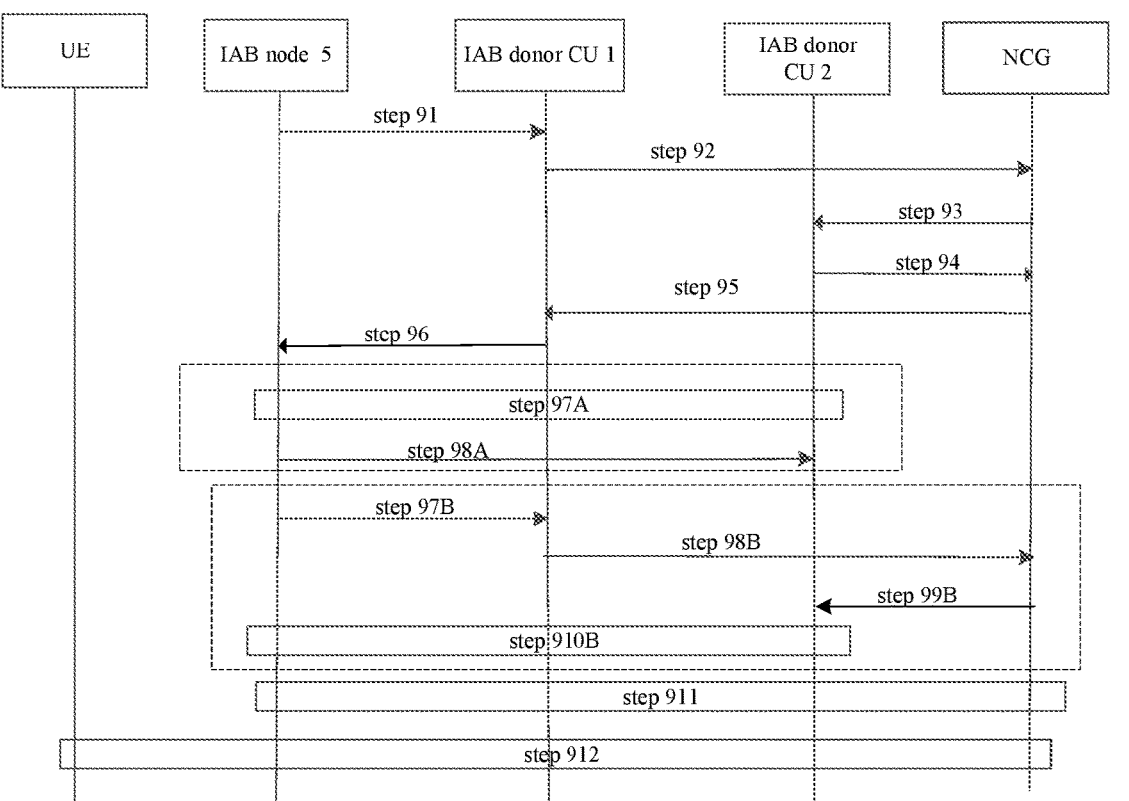
FIG. 8 is still yet another schematic view showing the process of the IAB node group switching using the information transmission method according to an embodiment of the present disclosure.

As shown in FIG. 8, a process of switching an IAB node 5 from CU 1 to CU 2 includes the following steps 91 to 99.

Step 91: an MT for the IAB node 5 transmits a measurement report to the IAB donor CU 1 through UL RRC transfer, and the measurement report is obtained through measurements in accordance with a position, a time and a load condition.

Step 92: the IAB node CU 1 transmits a handover required message to a core network. The handover required message carries an address of the IAB donor CU 1, PCIS, CGIs and IP addresses of the IAB node 5 and its descendant node in the IAB donor CU 1, a CGI of an IAB node 4 in the IAB donor CU 2, topological information of the IAB node 5 and its descendant node under the IAB donor CU 1, a DU ID of the IAB node 5, a DU ID of the descendant node of the IAB node 5, and a UE context list. The topological information includes a connection relationship between the IAB node 5 and its descendant node. The UE context list includes context information of the IAB node 5 and its descendant node, and/or context information of a UE under the IAB node 5 and a UE under its descendant node.

Step 93: the core network transmits a handover request to the IAB donor CU 2, and the handover request carries the address of the IAB donor CU 1, the PCIS, CGIs and IP addresses of the IAB node 5 and its descendant node in the IAB donor CU 1, the CGI and IP address of an IAB node 4 in the IAB donor CU 2, the topological information of the IAB node 5 and its descendant node under the IAB donor CU 1, the DU ID of the IAB node 5, the DU ID of the descendant node of the IAB node 5, and the UE context list.

Step 94: the IAB donor CU 2 transmits a handover request ACK to the core network. The handover request ACK carries an address of the IAB donor CU 2, a CGI assigned for the IAB node 5 at the IAB donor CU 2, a CGI assigned for the descendent node of the IAB node 5 at the IAB donor CU 2, a CGI of the IAB node 4 at the IAB donor CU 2, and F1 interface information configured by the IAB donor CU 2 for the DUs of the IAB node 5 and its descendant node. In a possible embodiment of the present disclosure, when the PCI and the IP address have been assigned for the IAB node 5 at the IAB donor CU 2, the handover request ACK may also carry the PCI and the IP address information assigned for the IAB node 5 at the IAB donor CU 2. In a possible embodiment of the present disclosure, when the PCI and the IP address have been assigned for the descendent node of the IAB node 5 at the IAB donor CU 2, the handover request ACK may further carry the PCI and the IP address information assigned for the descendent node of the IAB node 5 at the IAB donor CU 2.

Step 95: the core network transmits a handover command to the IAB donor CU 1, and the handover command carries the address of the IAB donor CU 2, the CGI assigned for the IAB node 5 at the IAB donor CU 2, the CGI assigned for the descendent node of the IAB node 5 at the IAB donor CU 2, the CGI of the IAB node 4 at the IAB donor CU 2, and the F1 interface information configured by the IAB donor CU 2 for the DUs of the IAB node 5 and its descendant node. In a possible embodiment of the present disclosure, when the PCI and the IP address have been assigned for the IAB node 5 at the IAB donor CU 2, the handover command may also carry the PCI and the IP address information assigned for the IAB node 5 at the IAB donor CU 2. In a possible embodiment of the present disclosure, when the PCI and the IP address have been assigned for the descendent node of the IAB node 5 at the IAB donor CU 2, the handover command may further carry the PCI and the IP address assigned for the descendent node of the IAB node 5 at the IAB donor CU 2.

Step 96: the IAB donor CU 1 transmits a UE context modification request to the IAB node 5, and the UE context modification request transmitted to the IAB node 5 carries the F1 interface information configured by the IAB donor CU 2 for the DU for the IAB node 5.

Steps 97A to 98A, or Steps 97B to 910B, are performed subsequent to Step 96.

Step 97A: the IAB node 5 establishes a connection between the DU for the IAB node 5 and the IAB donor CU 2 through the IAB donor CU 1 or the IAB donor DU 1 in accordance with the received F1 interface configuration information.

Step 98A: the IAB node 5 transmits a UE context modification response carrying migration confirm to the IAB donor CU 2.

Step 97B: the IAB node 5 transmits the UE context modification response carrying the migration confirm to the IAB donor CU 1.

Step 98B: the IAB donor CU 1 forwards the migration confirm to the core network.

Step 99B: the core network forwards the migration confirm to the IAB donor CU 2.

Step 910B: the IAB node 5 establishes the connection between the DU for the IAB node 5 and the IAB donor CU 2 through the IAB donor CU 1 in accordance with the received F1 interface configuration information.

Steps 911 and 912 are performed subsequent to Steps 97A to 98A, or subsequent to Steps 97B to 910B.

Step 911: interaction is performed among the IAB node 5, the IAB donor CU 1, the IAB donor CU 2, and the core network, so as to switch the MT for the IAB node 5 to the IAB donor CU 2.

Step 912: interaction is performed among the IAB node 5, the IAB donor CU 1, the IAB donor CU 2, the UE under the IAB node 5 and the core network, so as to switch the data transmission path for the UE under the IAB node 5 to the IAB donor CU 2.

In a word, in the case that there is the Xn interface between the IAB donor CU 1 and the IAB donor CU 2, the UE context list and the topological information are carried in the Xn handover request and the UE context setup request. The Xn handover request ACK carries the address of the IAB donor CU 2, the CGI assigned for the IAB node 5 at the IAB donor CU2, the CGI assigned for the descendant node of the IAB node 5 at the IAB donor CU 2, and the CGI of the IAB node 4 at the IAB donor CU 2. In a possible embodiment of the present disclosure, when the PCI is assigned for the IAB node 5 at the IAB donor CU 2, the Xn handover request ACK may further carry the PCI assigned for the IAB node 5 at the IAB donor CU 2. In a possible embodiment of the present disclosure, when the PCI is assigned for the descendant node of the IAB node 5 at the IAB donor CU 2, the Xn handover request ACK may further carry the PCI assigned for the descendant node of the IAB node 5 at the IAB donor CU 2.

In the case that there is no Xn interface between the IAB donor CU 1 and the IAB donor CU 2, the UE context list and the topological information are carried in the handover required message, the handover request and the UE context setup request. The handover request ACK and the handover command carry the address of the IAB donor CU 2, the CGI assigned for the IAB node 5 at the IAB donor CU 2, the CGI assigned for the descendant node of the IAB node 5 at the IAB donor CU 2, and the CGI of the IAB node 4 at the IAB donor CU 2. In a possible embodiment of the present disclosure, when the PCI and the IP address have been assigned for the IAB node 5 at the IAB donor CU 2, the handover request ACK and the handover command may further carry the PCI and the IP address assigned for the IAB node 5 at the IAB donor CU 2. In a possible embodiment of the present disclosure, when the PCI and the IP address have been assigned for the descendant node of the IAB node 5 at the IAB donor CU 2, the handover request ACK and the handover command may further carry the PCI and the IP address assigned for the descendant node of the IAB node 5 at the IAB donor CU 2.

It should be appreciated that, the Xn handover request, the UE context setup request, the Xn handover request ACK, the handover required message, the handover request, the handover request ACK and the handover command may carry the above-mentioned information in the processes in the above-mentioned first to fourth embodiments, or in any other processes.

In a word, according to the embodiments of the present disclosure, such a concept as group switching is introduced so as to simplify the IAB node switching process between the CUs. In the case that there is the Xn interface, the UE context of all the UEs under the migrating node (i.e., the UE connected to the migrating node and the UE connected to descendant node of the migrating node) is transmitted to the target CU through one message. In the case that there is no Xn interface, the UE context of all the UEs under the migrating node is transmitted to the target CU through the core network. In this way, no matter whether in the Xn group switching or the NG group switching, it is able to reduce the quantity of processes of interacting between the source CU and the target CU with respect to the UE context of each UE. In addition, for the switching of the IAB node between the CUs, a method is provided to notify, by the source CU, the target CU of the topological information of the migrating node and its descendant node in the source CU, so it is able for the target CU to determine a node to which a switched node after the group switching is to be connected.

The information transmission method in the IAB node group switching has been described hereinabove, and an information transmission device in the IAB node group switching will be described hereinafter in conjunction with the drawings.

As shown in FIG. 9, the present disclosure further provides in some embodiments an information transmission device in IAB node group switching for a target CU. The target CU is a CU for a donor in a target path. The information transmission device includes a first reception module 1001 configured to receive first information transmitted by a source CU, and the source CU is a CU for a donor in a source path for a migrating node. The first information includes at least one of topological information or context information. The topological information includes a connection relationship between the migrating node and a descendant node of the migrating node in the source CU, or includes the connection relationship between the migrating node and the descendant node of the migrating node. The context information includes at least one of node context information or context information of a UE. The node context information includes context information of the migrating node and context information of the descendant node of the migrating node, or includes at least one of the context information of the migrating node and the context information of the descendant node of the migrating node. The UEs include a UE connected to the migrating node and a UE connected to the descendant node of the migrating node, or include at least one of the UE connected to the migrating node and the UE connected to the descendant node of the migrating node.

In a possible embodiment of the present disclosure, an Xn interface is provided between the source CU and the target CU, and the first reception module 1001 is specifically configured to receive an Xn handover request message carrying the first information transmitted by the source CU.

In a possible embodiment of the present disclosure, no Xn interface is provided between the source CU and the target CU, the first reception module 1001 is specifically configured to receive a handover request message transmitted by a core network, the handover request message is transmitted by the core network after the receipt of a handover preparation message transmitted by the source CU, and each of the handover preparation message and the handover request message carries the first information.

In a possible embodiment of the present disclosure, the information transmission device further includes a second transmission module configured to transmit the first information to a second access node, and the second access node is an access node in the target path.

In a possible embodiment of the present disclosure, the second transmission module is specifically configured to transmit a UE context setup request message to the second access node, and the UE context setup request message carries the first information.

In a possible embodiment of the present disclosure, the information transmission device further includes a third transmission module configured to transmit second information to the source CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the third transmission module is specifically configured to transmit an Xn handover request acknowledgement message carrying the second information to the source CU.

In a possible embodiment of the present disclosure, no Xn interface is provided between the source CU and the target CU, the third transmission module is specifically configured to transmit a handover request acknowledgement message to a core network, to enable the core network to transmit a handover command message to the source CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, or identification information of to-be-switched DUs, or includes at least one of the address information of the source CU, the identification information of the migrating node in the source CU, the identification information of the descendant node of the migrating node in the source CU, the identification information of the second access node in the target CU, or the identification information of the to-be-switched DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

As shown in FIG. 10, the present disclosure further provides in some embodiments an information transmission device in IAB node group switching for a source CU. The source CU is a CU for a donor in a source path for the migrating node. The information transmission device includes a first transmission module 1101 configured to transmit first information to a target CU, and the target CU is a CU for a donor in a target path. The first information includes at least one of topological information or context information. The topological information includes a connection relationship between the migrating node and a descendant node of the migrating node in the source CU, or includes the connection relationship between the migrating node and the descendant node of the migrating node. The context information includes at least one of node context information or context information of a UE. The node context information includes context information of the migrating node and context information of the descendant node of the migrating node, or includes at least one of the context information of the migrating node and the context information of the descendant node of the migrating node. The UEs include a UE connected to the migrating node and a UE connected to the descendant node of the migrating node, or includes at least one of the UE connected to the migrating node and the UE connected to the descendant node of the migrating node.

In a possible embodiment of the present disclosure, an Xn interface is provided between the source CU and the target CU, and the first transmission module 1101 is specifically configured to transmit an Xn handover request message carrying the first information to the target CU.

In a possible embodiment of the present disclosure, no Xn interface is provided between the source CU and the target CU, the first transmission module 1101 is specifically configured to transmit a handover preparation message to a core network, to enable the core network to transmit a handover request message to the target CU, and each of the handover preparation message and the handover request message carries the first information.

In a possible embodiment of the present disclosure, the information transmission device further includes a second reception module configured to receive second information transmitted by the target CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the second reception module is specifically configured to receive an Xn handover request acknowledgement message carrying the second information transmitted by the target CU.

In a possible embodiment of the present disclosure, no Xn interface is provided between the source CU and the target CU, the second reception module is specifically configured to receive a handover command message transmitted by a core network, the handover command message is transmitted by the core network upon the receipt of a handover request acknowledgement message transmitted by the target CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, or identification information of to-be-switched DUs, or further includes at least one of the address information of the source CU, the identification information of the migrating node in the source CU, the identification information of the descendant node of the migrating node in the source CU, the identification information of the second access node in the target CU, or the identification information of to-be-switched DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

It should be appreciated that, the information transmission device in the embodiments of the present disclosure is used to implement all the steps of the above-mentioned information transmission method with a same technical effect, which will not be further particularly defined herein.

The present disclosure further provides in some embodiments a network device which, as shown in FIG. 11, includes a memory 1301, a transceiver 1302 and a processor 1303. The memory 1301 is configured to store therein a computer program. The transceiver 1302 is configured to receive and transmit data under the control of the processor 1303.

When the network device is applied to a target CU, the processor 1303 is configured to read the computer program in the memory 1301 so as to control the transceiver 1302 to receive first information transmitted by a source CU, and the source CU is a CU for a donor in a source path for a migrating node. The first information includes at least one of topological information or context information. The topological information includes a connection relationship between the migrating node and a descendant node of the migrating node in the source CU, or includes the connection relationship between the migrating node and the descendant node of the migrating node. The context information includes at least one of node context information or context information of a UE. The node context information includes context information of the migrating node and context information of the descendant node of the migrating node, or includes at least one of the context information of the migrating node and the context information of the descendant node of the migrating node. The UEs include a UE connected to the migrating node and a UE connected to the descendant node of the migrating node, or include at least one of the UE connected to the migrating node and the UE connected to the descendant node of the migrating node. The target CU is a CU for a donor in a target path.

In a possible embodiment of the present disclosure, an Xn interface is provided between the source CU and the target CU, and the receiving the first information transmitted by the source CU includes receiving an Xn handover request message transmitted by the source CU, the Xn handover request message carrying the first information.

In a possible embodiment of the present disclosure, no Xn interface is provided between the source CU and the target CU, the receiving the first information transmitted by the source CU includes receiving a handover request message transmitted by a core network, the handover request message is transmitted by the core network after the receipt of a handover preparation message transmitted by the source CU, and each of the handover preparation message and the handover request message carries the first information.

In a possible embodiment of the present disclosure, subsequent to controlling the transceiver 1302 to receive the first information transmitted by the source CU, the processor is further configured to control the transceiver 1302 to transmit the first information to a second access node, and the second access node is an access node in the target path.

In a possible embodiment of the present disclosure, the transmitting the first information to the second access node includes transmitting a UE context setup request message to the second access node, wherein the UE context setup request message carries the first information.

In a possible embodiment of the present disclosure, the processor is further configured to control the transceiver 1302 to transmit second information to the source CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the transmitting the second information to the source CU includes transmitting an Xn handover request acknowledgement message to the source CU, wherein the Xn handover request acknowledgement message carrying the second information.

In a possible embodiment of the present disclosure, no Xn interface is provided between the source CU and the target CU, the transmitting the second information to the source CU includes transmitting a handover request acknowledgement message to a core network, to enable the core network to transmit a handover command message to the source CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, and identification information of to-be-switched DUs, or further includes at least one of the address information of the source CU, the identification information of the migrating node in the source CU, the identification information of the descendant node of the migrating node in the source CU, the identification information of the second access node in the target CU, or the identification information of to-be-switched DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

When the network device is applied to a source CU, the processor 1303 is configured to read the computer program in the memory 1301, so as to control the transceiver 1302 to transmit first information to a target CU, and the target CU is a CU for a donor in a target path. The first information includes at least one of topological information or context information. The topological information includes a connection relationship between the migrating node and a descendant node of the migrating node in the source CU, or includes the connection relationship between the migrating node and the descendant node of the migrating node. The context information includes at least one of node context information or context information of a UE. The node context information includes context information of the migrating node and context information of the descendant node of the migrating node, or includes at least one of the context information of the migrating node and the context information of the descendant node of the migrating node. The UEs include a UE connected to the migrating node and a UE connected to the descendant node of the migrating node, or includes at least one of the UE connected to the migrating node and the UE connected to the descendant node of the migrating node. The source CU is a CU for a donor in a source path for the migrating node.

In a possible embodiment of the present disclosure, an Xn interface is provided between the source CU and the target CU, and the transmitting the first information to the target CU includes transmitting an Xn handover request message to the target CU, and the Xn handover request message carrying the first information.

In a possible embodiment of the present disclosure, no Xn interface is provided between the source CU and the target CU, the transmitting the first information to the target CU includes transmitting a handover preparation message to a core network, to enable the core network to transmit a handover request message to the target CU, and each of the handover preparation message and the handover request message carries the first information.

In a possible embodiment of the present disclosure, the processor is further configured to control the transceiver 1302 to receive second information transmitted by the target CU, the second information includes at least one of address information of the target CU, identification information assigned by the target CU to the migrating node, identification information assigned by the target CU to the descendant node of the migrating node, or identification information of a second access node in the target CU, and the second access node is an access node in the target path.

In a possible embodiment of the present disclosure, an Xn interface is provided between the source CU and the target CU, and the receiving the second information transmitted by the target CU includes receiving an Xn handover request acknowledgement message carrying the second information transmitted by the target CU.

In a possible embodiment of the present disclosure, no Xn interface is provided between the source CU and the target CU, the receiving the second information transmitted by the target CU includes receiving a handover command message transmitted by a core network, the handover command message is transmitted by the core network upon the receipt of a handover request acknowledgement message transmitted by the target CU, and each of the handover request acknowledgement message and the handover command message carries the second information.

In a possible embodiment of the present disclosure, the connection relationship between the migrating node and the descendant node of the migrating node in the source CU, or the connection relationship between the migrating node and the descendant node of the migrating node, includes one of: an association relationship between a CGI of the migrating node and a CGI of the descendant node of the migrating node; an association relationship between a PCI of the migrating node and a PCI of the descendant node of the migrating node; an association relationship between an IP address of the migrating node and an IP address of the descendant node of the migrating node; or an association relationship between a BAP layer address of the migrating node and a BAP layer address of the descendant node of the migrating node.

In a possible embodiment of the present disclosure, the first information further includes address information of the source CU, identification information of the migrating node in the source CU, identification information of the descendant node of the migrating node in the source CU, identification information of a second access node in the target CU, or identification information of to-be-switched DUs, or further includes at least one of the address information of the source CU, the identification information of the migrating node in the source CU, the identification information of the descendant node of the migrating node in the source CU, the identification information of the second access node in the target CU, or the identification information of to-be-switched DUs. The second access node is an access node in the target path, and the to-be-switched DUs include a DU of the migrating node and a DU of the descendant node of the migrating node.

In a possible embodiment of the present disclosure, the identification information includes one or more of a PCI, a CGI, or an IP address.

In FIG. 11, bus architecture may include a number of buses and bridges connected to each other, so as to connect various circuits for one or more processors 1303 and one or more memories 1301. In addition, as is known in the art, the bus architecture may be used to connect any other circuits, such as a circuit for a peripheral device, a circuit for a voltage stabilizer and a power management circuit, which will not be further particularly defined herein. A bus interface may be provided, and the transceiver 1302 may consist of a plurality of elements, i.e., a transmitter and a receiver for communication with any other devices over a transmission medium. The transmission medium includes a wireless channel, a wired channel, or an optical cable. The processor 1303 may take charge of managing the bus architecture as well as general processings. The memory 1301 may store therein data for the operation of the processor 1303.

In a possible embodiment of the present disclosure, the processor 610 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

It should be appreciated that, the network device in the embodiments of the present disclosure is used to implement all the steps of the above-mentioned information transmission method with a same technical effect, which will not be further particularly defined herein.

The present disclosure further provides in some embodiments an information transmission system, which includes the network device for the target CU and the network device for the source CU.

The present disclosure further provides in some embodiments a processor-readable storage medium storing therein a computer program. The computer program is configured to be executed by a processor to implement the above-mentioned information transmission methods in the IAB node group switching.

The processor-readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to a disk memory and an optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above-mentioned device embodiments are merely for illustrative purposes. The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

The members in the embodiments of the present disclosure may be implemented as hardware, or software modules run on one or more processors, or a combination thereof. It should be appreciated that, some or all functions of some or all members in the scheme may be achieved via a microprocessor or a Digital Signal Processor (DSP) in practice.

In addition, the scheme in the embodiments of the present disclosure may also be implemented as a device or apparatus program (e.g., a computer program and a computer program product) capable of executing parts or all of the steps of the mentioned method. The program may be stored in a computer-readable medium, or may be provided in the form of one or more signals. The signals may be downloaded from Internet, or acquired from a carrier, or provided in any other form.

Figure 16:
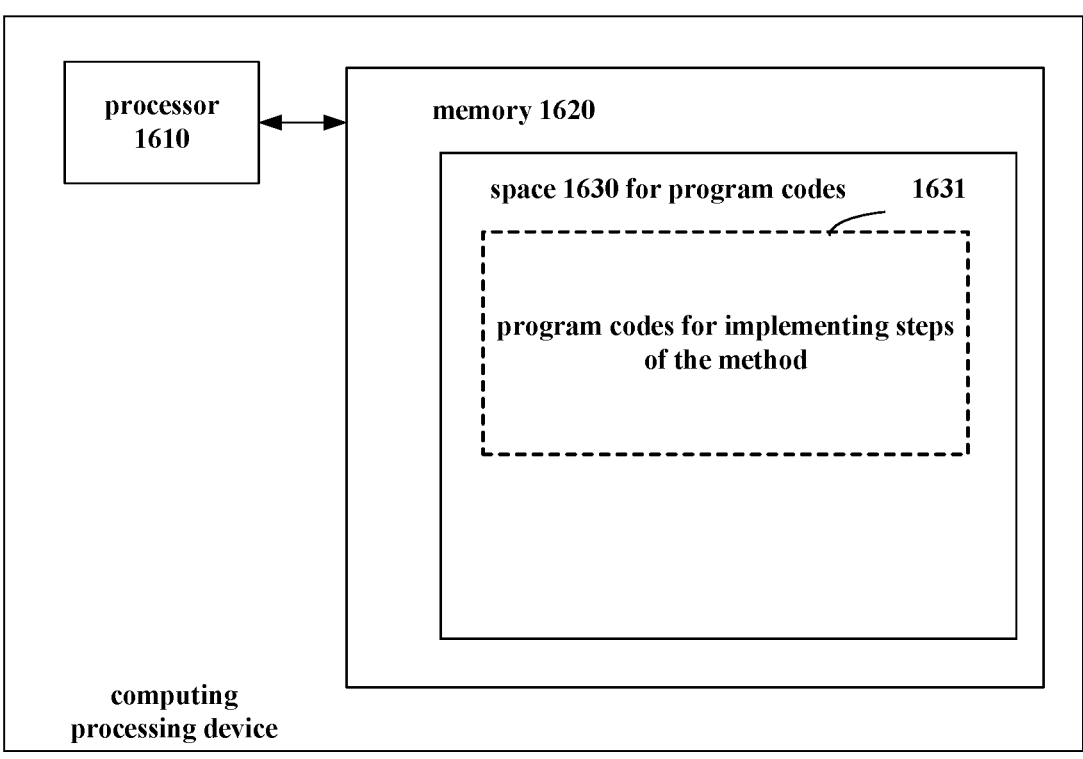
FIG. 16 is a block diagram of a computing processing device for implementing the method according to an embodiment of the present disclosure.
Figure 17:
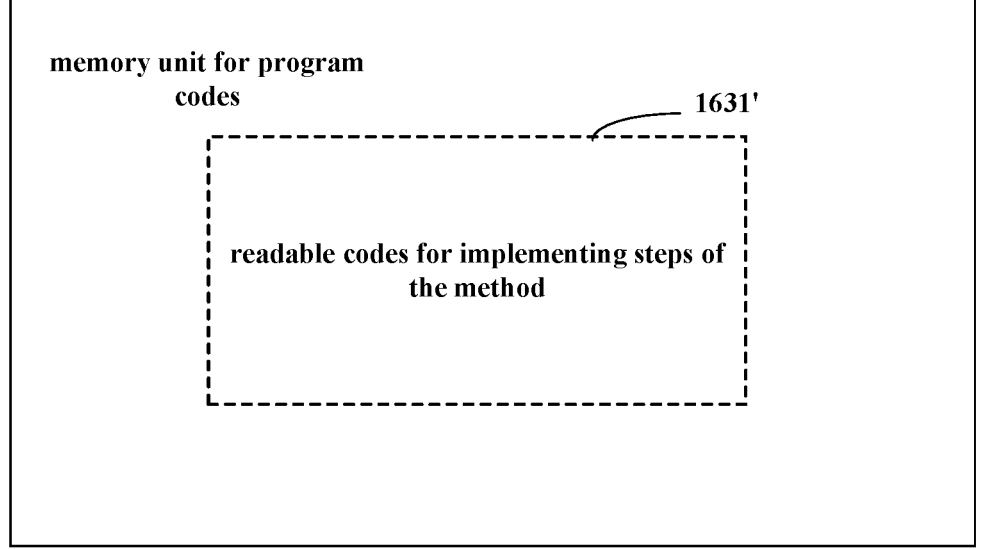
FIG. 17 is a schematic view showing a memory unit for holding or carrying a program code for implementing the method according to an embodiment of the present disclosure.

For example, FIG. 16 shows a computing processing device for implementing the information transmission method in the embodiments of the present disclosure. The computing processing device includes a processor 1610, and a computer program product or a computer-readable medium in the form of a memory 1620. The memory 1620 is a flash memory, an EEPROM, an EPROM, a hard disk or an ROM. The memory 1620 is provided with a storage space 1630 for a program code 1631 for implementing the steps of the above-mentioned information transmission method. For example, the memory space 1630 for the program code includes various program codes 1631 for implementing the steps of the above-mentioned method, and these program codes are read from or written into one or more computer program products. The computer program products include hard disk, CD, memory card or floppy disk. Usually, the computer program product is a portable or immobile memory unit as shown in FIG. 17. The memory unit is provided with a memory section or memory space similar to the memory 1602 in the computing processing device in FIG. 16. The program code is compressed in an appropriate manner. Usually, the memory unit includes computer-readable codes 1631', i.e., codes read by a processor such as the processor 1610. When the codes are executed by the computing processing device, it is able to implement the steps of the above-mentioned method.

Such phrases as "one embodiment", "embodiments" or "one or more embodiments" intend to indicate that the specific features, structures or characteristics are contained in at least one embodiment of the present disclosure, rather than referring to an identical embodiment.

Although with a large amount of details mentioned hereinabove, the present disclosure will be practiced without these details. In some embodiments of the present disclosure, methods, structures and techniques known in the art will not be described, so as not to confuse the understanding of the present disclosure.

In the appended claims, any reference numeral in parenthesis shall not be construed as limiting the claims. The word "include" shall not be construed as excluding any other member or component not defined in the claims. The expression "one" or "one of" ahead of a member or component shall not be construed as excluding more than one member or component. The scheme in the present disclosure may be implemented through a device including different members. In the appended claims where several members have been defined, some of these members may be implemented as a same member. The words "first", "second" and "third" shall not be used to represent any order, and these words may be interpreted as nomenclatures Obviously, those skilled in the art can make various changes and modifications to the application without departing from the spirit and scope of the application. In this way, if these modifications and variations of the present application fall within the scope of the claims of the present application and their equivalent technologies, the present application is also intended to include these modifications and variations.

What is claimed is:

1. An information transmission method in Integrated Access and Backhaul (IAB) node group switching, wherein the information transmission method is performed by a target Centralized Unit (CU), the target CU is a CU for a donor in a target path, wherein the information transmission method comprises:

receiving first information transmitted by a source CU, wherein the source CU is a CU for a donor in a source path for a migrating node;

the first information comprises topological information, or the first information comprises the topological information and context information;

the topological information comprises a connection relationship between the migrating node and a descendant node of the migrating node;

the context information comprises at least one of node context information or context information of a User Equipment (UE), the node context information comprises at least one of context information of the migrating node or context information of the descendant node of the migrating node;

the UE comprises at least one of a UE connected to the migrating node or a UE connected to the descendant node of the migrating node;

wherein an Xn interface is provided between the source CU and the target CU;

the receiving the first information transmitted by the source CU comprises:

receiving an Xn handover request message transmitted by the source CU, the Xn handover request message carrying the first information;

wherein the connection relationship between the migrating node and the descendant node of the migrating node comprises one of:

an association relationship between a Cell Global Identifier (CGI) of the migrating node and a CGI of the descendant node of the migrating node;

an association relationship between a Physical Cell Identifier (PCI) of the migrating node and a PCI of the descendant node of the migrating node;

an association relationship between an Internet Protocol (IP) address of the migrating node and an IP address of the descendant node of the migrating node; or an association relationship between a Backhaul Adaptation Protocol (BAP) layer address of the migrating node and a BAP layer address of the descendant node of the migrating node.

2. The information transmission method according to claim 1, wherein no Xn interface is provided between source CU and the target CU; the receiving the first information transmitted by the source CU comprises: receiving a handover request message transmitted by a core network, the handover request message is transmitted by the core network after the receipt of a handover preparation message transmitted by the source CU, and each of the handover preparation message and the handover request message carries the first information; or the information transmission method further comprises: transmitting second information to the source CU, wherein the second information comprises at least one of address information of the target CU, identification information assigned by the target CU to the migrating node, identification information assigned by the target CU to the descendant node of the migrating node, or identification information of a second access node in the target CU; wherein the second access node is an access node in the target path.

3. The information transmission method according to claim 1, wherein subsequent to receiving the first information transmitted by the source CU, the information transmission method further comprises:

transmitting the first information to a second access node, wherein the second access node is an access node in the target path.

4. The information transmission method according to claim 3, wherein the transmitting the first information to the second access node comprises:

transmitting a UE context setup request message to the second access node, wherein the UE context setup request message carries the first information.

5. The information transmission method according to claim 1, further comprises:

transmitting second information to the source CU, wherein the second information comprises at least one of address information of the target CU, identification information assigned by the target CU to the migrating node, identification information assigned by the target CU to the descendant node of the migrating node, or identification information of a second access node in the target CU; wherein the second access node is an access node in the target path.

6. The information transmission method according to claim 5, wherein an Xn interface is provided between the source CU and the target CU; the transmitting the second information to the source CU comprises: transmitting an Xn handover request acknowledgement message to the source CU, wherein the Xn handover request acknowledgement message carries the second information; or wherein the identification information comprises one or more of a PCI, a CGI, or an IP address.

7. The information transmission method according to claim 5, wherein no Xn interface is provided between the source CU and the target CU;

the transmitting the second information to the source CU comprises:

transmitting a handover request acknowledgement message to a core network, to enable the core network to transmit a handover command message to the source CU, wherein each of the handover request acknowledgement message and the handover command message carries the second information.

8. The information transmission method according to claim 1, wherein the first information further comprises one or more of: address information of the source CU, identification information of the migrating node in the source CU, identification information of the descendant node of the migrating node in the source CU, identification information of a second access node in the target CU, or identification information of to-be-switched Distribution Units (DUs);

wherein the second access node is an access node in the target path, the to-be-switched DUs comprise a DU of the migrating node and a DU of the descendant node of the migrating node.

9. The information transmission method according to claim 8, wherein the identification information comprises one or more of a PCI, a CGI, or an IP address.

10. An information transmission method for IAB node group switching, wherein the information transmission method is performed by a source CU, the source CU is a CU for a donor in a source path for the migrating node, wherein the information transmission method comprises:

transmitting first information to a target CU, wherein the target CU is a CU for a donor in a target path;

the first information comprises topological information, or the first information comprises the topological information and context information;

the topological information comprises a connection relationship between the migrating node and a descendant node of the migrating node;

the context information comprises at least one of node context information or context information of a UE, the node context information comprises at least one of context information of the migrating node or context information of the descendant node of the migrating node;

the UE comprises at least one of a UE connected to the migrating node or a UE connected to the descendant node of the migrating node;

wherein an Xn interface is provided between the source CU and the target CU;

the transmitting the first information to the target CU comprises:

transmitting an Xn handover request message to the target CU, and the Xn handover request message carrying the first information;

wherein the connection relationship between the migrating node and the descendant node of the migrating node comprises one of:

an association relationship between a Cell Global Identifier (CGI) of the migrating node and a CGI of the descendant node of the migrating node;

an association relationship between a Physical Cell Identifier (PCI) of the migrating node and a PCI of the descendant node of the migrating node;

an association relationship between an Internet Protocol (IP) address of the migrating node and an IP address of the descendant node of the migrating node; or an association relationship between a Backhaul Adaptation Protocol (BAP) layer address of the migrating node and a BAP layer address of the descendant node of the migrating node.

11. The information transmission method according to claim 10, wherein no Xn interface is provided between the source CU and the target CU;

the transmitting the first information to the target CU comprises:

transmitting a handover preparation message to a core network, to enable the core network to transmit a handover request message to the target CU, and each of the handover preparation message and the handover request message carries the first information.

12. The information transmission method according to claim 10, further comprises:

receiving second information transmitted by the target CU, wherein the second information comprises at least one of address information of the target CU, identification information assigned by the target CU to the migrating node, identification information assigned by the target CU to the descendant node of the migrating node, or identification information of a second access node in the target CU; wherein the second access node is an access node in the target path.

13. The information transmission method according to claim 12, wherein an Xn interface is provided between the source CU and the target CU;

the receiving the second information transmitted by the target CU comprises:

receiving an Xn handover request acknowledgement message transmitted by the target CU, wherein the Xn handover request acknowledgement message carries the second information.

14. The information transmission method according to claim 12, wherein no Xn interface is provided between the source CU and the target CU; the receiving the second information transmitted by the target CU comprises: receiving a handover command message transmitted by a core network, the handover command is transmitted by the core network after the receipt of a handover request acknowledgement message transmitted by the target CU, and each of the handover request acknowledgement message and the handover command message carries the second information; or the identification information comprises one or more of a PCI, a CGI, or an IP address.

15. The information transmission method according to claim 10, wherein the first information further comprises one or more of address information of the source CU, identification information of the migrating node in the source CU, identification information of the descendant node of the migrating node in the source CU, identification information of a second access node in the target CU, or identification information of to-be-switched Distribution Units (DUs), wherein the second access node is an access node in the target path, and the to-be-switched DUs comprise a DU of the migrating node and a DU of the descendant node of the migrating node, wherein the identification information comprises one or more of a PCI, a CGI, or an IP address.

16. A network device for a source CU, the source CU being a CU for a donor in a source path for a migrating node, wherein the network device comprises a memory, a transceiver and a processor, wherein the memory is configured to store therein a computer program, the transceiver is configured to transmit and receive data under control of the processor, the processor is configured to read the computer program in the memory to implement the information transmission method according to claim 10.

17. A network device for a target CU, the target CU being a CU for a donor in a target path, wherein the network device comprises a memory, a transceiver and a processor, wherein the memory is configured to store therein a computer program, the transceiver is configured to transmit and receive data under control of the processor, the processor is configured to read the computer program in the memory to:

control the transceiver to receive first information transmitted by a source CU, wherein the source CU is a CU for a donor in a source path for a migrating node;

the first information comprises topological information, or the first information comprises the topological information and context information;

the topological information comprises a connection relationship between the migrating node and a descendant node of the migrating node;

the context information comprises at least one of node context information or context information of a UE, the node context information comprises at least one of context information of the migrating node or context information of the descendant node of the migrating node;

the UE comprises at least one of a UE connected to the migrating node or a UE connected to the descendant node of the migrating node;

wherein an Xn interface is provided between the source CU and the target CU;

the step of receiving the first information transmitted by the source CU comprises:

receiving an Xn handover request message transmitted by the source CU, the Xn handover request message carrying the first information;

wherein the connection relationship between the migrating node and the descendant node of the migrating node comprises one of:

an association relationship between a Cell Global Identifier (CGI) of the migrating node and a CGI of the descendant node of the migrating node;

an association relationship between a Physical Cell Iden-
tifier (PCI) of the migrating node and a PCI of the
descendant node of the migrating node;

an association relationship between an Internet Protocol
(IP) address of the migrating node and an IP address of
the descendant node of the migrating node; or an association relationship between a Backhaul Adapta-
tion Protocol (BAP) layer address of the migrating
node and a BAP layer address of the descendant node
of the migrating node.

* * * * *